(12) United States Patent
Nakano et al.

(10) Patent No.: US 9,738,800 B2
(45) Date of Patent: Aug. 22, 2017

(54) PHOTOCURABLE INK COMPOSITION, RECORDING METHOD, RECORDING APPARATUS, PHOTOCURABLE INK JET RECORDING INK COMPOSITION, AND INK JET RECORDING METHOD

(75) Inventors: Keitaro Nakano, Matsumoto (JP); Hiroshi Fukumoto, Shiojiri (JP); Hiroki Nakane, Matsumoto (JP); Hiroaki Kida, Shiojiri (JP); Toru Saito, Yamagata-mura (JP); Chigusa Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 470 days.

(21) Appl. No.: 13/458,184

(22) Filed: Apr. 27, 2012

(65) Prior Publication Data
US 2012/0274717 A1 Nov. 1, 2012

(30) Foreign Application Priority Data

Apr. 28, 2011 (JP) ................ 2011-101154
Jun. 7, 2011 (JP) ................ 2011-127326
Nov. 14, 2011 (JP) ................ 2011-248281

(51) Int. Cl.
*B41J 2/01* (2006.01)
*C09D 11/101* (2014.01)
*B41J 2/21* (2006.01)
*B41J 11/00* (2006.01)

(52) U.S. Cl.
CPC ........... *C09D 11/101* (2013.01); *B41J 2/2107* (2013.01); *B41J 11/002* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ..... 347/100, 95, 96, 101, 102, 103, 105, 88, 347/99, 21, 20, 9; 106/31.6, 31.13, 106/31.27; 523/160, 161
See application file for complete search history.

(56) References Cited

U.S. PATENT DOCUMENTS

| | | | |
|---|---|---|---|
| 4,507,466 A | 3/1985 | Tomalia et al. | |
| 4,558,120 A | 12/1985 | Tomalia et al. | |
| 4,568,737 A | 2/1986 | Tomalia et al. | |
| 4,587,329 A | 5/1986 | Tomalia et al. | |
| 4,631,337 A | 12/1986 | Tomalia et al. | |
| 4,694,064 A | 9/1987 | Tomalia et al. | |
| 5,041,516 A | 8/1991 | Frechet et al. | |
| 6,023,547 A * | 2/2000 | Tortorello | 428/378 |
| 6,310,115 B1 | 10/2001 | Vanmaele et al. | |
| 6,767,980 B2 | 7/2004 | Yurugi et al. | |
| 6,913,352 B2 * | 7/2005 | Yoshihiro et al. | 347/100 |
| 6,966,643 B2 * | 11/2005 | Hale et al. | 347/88 |
| 7,396,861 B2 | 7/2008 | Loccufier et al. | |
| 7,507,773 B2 | 3/2009 | Loccufier et al. | |
| 7,507,785 B2 | 3/2009 | Vanmaele et al. | |
| 7,538,144 B2 | 5/2009 | Vanmaele et al. | |
| 7,795,324 B2 | 9/2010 | Loccufier et al. | |
| 7,803,851 B2 | 9/2010 | Ishibashi et al. | |
| 7,875,698 B2 | 1/2011 | Vanmaele et al. | |
| 7,931,827 B2 | 4/2011 | Schneider et al. | |
| 8,158,214 B2 | 4/2012 | Fukumoto et al. | |
| 8,192,804 B2 | 6/2012 | Fukumoto et al. | |
| 8,470,904 B2 | 6/2013 | Sato et al. | |
| 9,090,787 B2 | 7/2015 | Yoda et al. | |
| 9,109,125 B2 | 8/2015 | Miura et al. | |
| 9,115,290 B2 | 8/2015 | Kida et al. | |
| 9,469,771 B2 | 10/2016 | Mizutaki et al. | |
| 2002/0065335 A1 * | 5/2002 | Noguchi et al. | 347/44 |
| 2002/0149659 A1 * | 10/2002 | Wu et al. | 347/102 |
| 2003/0199655 A1 | 10/2003 | Yurugi et al. | |
| 2004/0141040 A1 * | 7/2004 | Nakajima | 347/102 |
| 2004/0145639 A1 | 7/2004 | Noutary | |
| 2004/0166249 A1 | 8/2004 | Siegel | |
| 2006/0158493 A1 | 7/2006 | Nakano et al. | |
| 2006/0160917 A1 | 7/2006 | Oyanagi et al. | |
| 2007/0129457 A1 | 6/2007 | Nakano et al. | |
| 2007/0211111 A1 | 9/2007 | Hayata | |
| 2007/0249750 A1 | 10/2007 | Oyanagi et al. | |
| 2008/0081119 A1 * | 4/2008 | Oyanagi et al. | 106/31.13 |
| 2008/0090930 A1 | 4/2008 | Madhusoodhanan et al. | |
| 2008/0108747 A1 * | 5/2008 | Nakamura et al. | 524/606 |
| 2008/0166495 A1 | 7/2008 | Maeno et al. | |

(Continued)

FOREIGN PATENT DOCUMENTS

CN 101163758 A 4/2008
CN 101573387 A 11/2009

(Continued)

OTHER PUBLICATIONS

[No Author Listed] High lights! Radiation curing with resins and photoinitiators for industrial coatings and graphic arts: Laromer, Irgacure, Lucirin, Darocur. BASF SE. No publishing date available. 44 pages.

*Primary Examiner* — Manish S Shah
(74) *Attorney, Agent, or Firm* — Nutter McClennen & Fish LLP; John J. Penny, Jr.; Alex Nagorniy

(57) ABSTRACT

A photocurable ink composition includes polymerizable compounds and a photopolymerization initiator. The polymerizable compounds include vinyl ether group-containing (meth)acrylic esters represented by the following Formula (I):

$$CH_2=CR^1-COOR^2-O-CH=CH-R^3 \qquad (I)$$

(wherein, $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms), dipropylene glycol di(meth)acrylate, and monofunctional (meth)acrylate having an aromatic ring skeleton. The ink composition includes a coloring material.

10 Claims, No Drawings

(56) References Cited

U.S. PATENT DOCUMENTS

| | | | |
|---|---|---|---|
| 2008/0180503 A1 | 7/2008 | Umebayashi | |
| 2008/0200578 A1 | 8/2008 | Noutary | |
| 2008/0226834 A1 | 9/2008 | Krohn | |
| 2008/0239045 A1 | 10/2008 | Umebayashi et al. | |
| 2009/0000508 A1* | 1/2009 | Edison et al. | 106/31.6 |
| 2009/0041946 A1 | 2/2009 | Fukumoto et al. | |
| 2009/0099277 A1 | 4/2009 | Nagvekar et al. | |
| 2009/0118388 A1* | 5/2009 | Naruse et al. | 522/39 |
| 2009/0197988 A1* | 8/2009 | Kito et al. | 522/26 |
| 2009/0280302 A1* | 11/2009 | Fukumoto et al. | 428/195.1 |
| 2010/0048756 A1 | 2/2010 | Loccufier et al. | |
| 2010/0133728 A1 | 6/2010 | Yonezawa et al. | |
| 2010/0313782 A1* | 12/2010 | Loccufier et al. | 101/483 |
| 2011/0234680 A1 | 9/2011 | Aoyama et al. | |
| 2011/0251298 A1 | 10/2011 | Kagose et al. | |
| 2012/0069108 A1 | 3/2012 | Oyanagi et al. | |
| 2012/0147095 A1 | 6/2012 | Miura et al. | |
| 2012/0229583 A1 | 9/2012 | Fukumoto et al. | |
| 2012/0252919 A1 | 10/2012 | Suzuki et al. | |
| 2013/0010039 A1 | 1/2013 | Kida et al. | |
| 2013/0063535 A1 | 3/2013 | Yoda et al. | |
| 2013/0258015 A1 | 10/2013 | Mizutaki et al. | |
| 2014/0104356 A1 | 4/2014 | Kitade et al. | |
| 2014/0160215 A1 | 6/2014 | Saito et al. | |
| 2015/0275001 A1 | 10/2015 | Yoda et al. | |
| 2015/0315394 A1 | 11/2015 | Miura et al. | |
| 2015/0315396 A1 | 11/2015 | Kida et al. | |

FOREIGN PATENT DOCUMENTS

| | | |
|---|---|---|
| EP | 2 017 311 A1 | 1/2009 |
| EP | 2 053 103 A1 | 4/2009 |
| EP | 2 399 965 A1 | 12/2011 |
| EP | 2 399 966 A1 | 12/2011 |
| EP | 2 543 707 A1 | 1/2013 |
| JP | 11-302562 A | 11/1999 |
| JP | 3461501 B1 | 10/2003 |
| JP | 2004-067991 A | 3/2004 |
| JP | 2004-099796 A | 4/2004 |
| JP | 3544658 B2 | 7/2004 |
| JP | 2004-224841 A | 8/2004 |
| JP | 2004-526820 A | 9/2004 |
| JP | 2006-028518 A | 2/2006 |
| JP | 2006-176734 A | 7/2006 |
| JP | 2006-181801 A | 7/2006 |
| JP | 2006-199924 A | 8/2006 |
| JP | 2006-206875 A | 8/2006 |
| JP | 2006-232989 A | 9/2006 |
| JP | 2007-045989 A | 2/2007 |
| JP | 2007-083509 A | 4/2007 |
| JP | 2007-100054 A | 4/2007 |
| JP | 2007-136988 A | 6/2007 |
| JP | 2007-182536 A | 7/2007 |
| JP | 2007314744 | 12/2007 |
| JP | 2007314775 | 12/2007 |
| JP | 2008-019292 A | 1/2008 |
| JP | 2008-507598 A | 3/2008 |
| JP | 2008120991 | 5/2008 |
| JP | 2008-163080 A | 7/2008 |
| JP | 2008-179136 A | 8/2008 |
| JP | 2008-246832 A | 10/2008 |
| JP | 2008-280383 A | 11/2008 |
| JP | 4204333 B2 | 1/2009 |
| JP | 2009-035650 A | 2/2009 |
| JP | 2009-057548 A | 3/2009 |
| JP | 2009-062541 A | 3/2009 |
| JP | 2009-096910 A | 5/2009 |
| JP | 2009-226863 A | 10/2009 |
| JP | 2010-138315 A | 6/2010 |
| JP | 2010-157706 A | 7/2010 |
| JP | 2010-179536 A | 8/2010 |
| JP | 2011-500932 A | 1/2011 |
| JP | 2011-502188 A | 1/2011 |
| JP | 2011-074134 A | 4/2011 |
| JP | 2011-137069 A | 7/2011 |
| JP | 2011-194573 A | 10/2011 |
| JP | 2012-207084 A | 10/2012 |
| JP | 2013-053208 A | 3/2013 |
| WO | 03089486 A1 | 10/2003 |
| WO | 2006/085992 A2 | 8/2006 |
| WO | 2009/053305 A1 | 4/2009 |
| WO | 2011/027162 A1 | 3/2011 |
| WO | 2011/076703 A1 | 6/2011 |
| WO | 2012/172973 A1 | 12/2012 |
| WO | 2012/172974 A1 | 12/2012 |

* cited by examiner

PHOTOCURABLE INK COMPOSITION, RECORDING METHOD, RECORDING APPARATUS, PHOTOCURABLE INK JET RECORDING INK COMPOSITION, AND INK JET RECORDING METHOD

CROSS REFERENCES TO RELATED APPLICATIONS

The present invention contains subject matters related to Japanese Patent Application No. 2011-101154 filed in the Japanese Patent Office on Apr. 28, 2011, Japanese Patent Application No. 2011-248281 filed in the Japanese Patent Office on Nov. 14, 2011, and Japanese Patent Application No. 2011-127326 filed in the Japanese Patent Office on Jun. 7, 2011, the entire contents of which are incorporated herein by reference.

BACKGROUND

1. Technical Field

The present invention relates to a photocurable ink composition, a recording method, and a recording apparatus. The invention also relates to a photocurable ink jet recording ink composition and an ink jet recording method.

2. Related Art

Various systems have been utilized as recording methods of forming images on recording media such as paper based on image data signals. Among them, an ink jet system is an inexpensive apparatus and directly forms an image on a recording medium by discharging an ink only on a necessary image area and therefore efficiently uses inks at low running cost. In addition, the ink jet system is low in noise and is therefore excellent as a recording method.

Recently, in the recording method of the ink jet system, a photocurable ink composition, which is cured by light irradiation, is used as an ink composition that can provide high water resistance, solvent resistance, abrasion resistance, etc.

For example, JP-T-2004-526820 discloses an ink jet ink that does not substantially contain water and/or any volatile solvent and contains at least one multifunctional (meth)acrylate monomer, at least one $\alpha,\beta$-unsaturated ether monomer, at least one radical photopolymerization initiator, and at least one dispersible pigment. The content of the multifunctional (meth)acrylate monomer is 2 to 15 parts by weight based on 1 part by weight of the $\alpha,\beta$-unsaturated ether monomer, the ink has a viscosity at 25° C. of less than 100 mPa·s, and the content of the $\alpha,\beta$-unsaturated ether monomer in the ink is 1 to 30% by weight.

For example, JP-A-2008-19292 discloses a photocurable composition that contains a polymerizable compound (a), 0.1 to 15% by mass of a photopolymerization initiator and/or photoacid generator (b), and 0.001 to 5% by mass of at least one of fluorochemical surfactants, silicone surfactants, and fluoro-silicone surfactants (c), and has a viscosity at 25° C. of 3 to 18 mPa·s (d). The polymerizable compound (a) includes a polymerizable unsaturated monomer (e) having a primary skin irritation index (PII) value of 4.0 or less and a polymerizable unsaturated monomer (f) having a viscosity at 25° C. of 30 mPa·s or less each in an amount of 50% by mass or more. The polymerizable unsaturated monomer (e) and the polymerizable unsaturated monomer (f) may be partially or totally the same polymerizable unsaturated monomer.

For example, JP-A-2004-224841 discloses an active energy ray-curable composition containing prescribed vinyl ether group-containing (meth)acrylic esters (A), a 1,3-dioxolane ring and/or 2-oxo-1,3-dioxolane ring (B), and a photopolymerization initiator (C).

For example, JP-A-2008-179136 discloses a method of forming an image by applying an undercoating liquid containing 2-(2-hydroxyethoxy)ethyl acrylate, isobonyl acrylate, and a polymerization initiator onto an intermediate transcript, subsequently discharging an ink containing 2-(2-hydroxyethoxy)ethyl acrylate, isobonyl acrylate, a polymerization initiator, a pigment, a dispersant, and a surfactant onto the intermediate transcript, and then transferring the ink onto a recording medium.

Unfortunately, the ink jet ink described in JP-T-2004-526820, the photocurable composition described in JP-A-2008-19292, the active energy ray-curable composition described in JP-A-2004-224841, and the ink used in the image-forming method described in JP-A-2008-179136 cause problems of being inferior curing or occurrence of wrinkles on a coating film surface after curing (hereinafter, also referred to as "curing wrinkles").

Furthermore, for example, Japanese Patent Nos. 3461501 and 3544658 disclose an active energy ray-curable ink jet printing ink or a reactive diluent composition composed of 2-(vinyloxyethoxy)ethyl acrylate or 2-(vinyloxyethoxy)ethyl methacrylate, 2-(hydroxyethoxy)ethyl vinyl ether as a polymerizable compound containing a hydroxyl group, a colorant, and a photopolymerization initiator.

For example, JP-A-2009-62541 discloses an ink jet ink containing at least one multifunctional (meth)acrylate monomer, at least one vinyl ether monomer, at least one radical photopolymerization initiator, and at least one dispersible pigment. The amount of the multifunctional (meth)acrylate monomer is 2 to 15 parts by weight based on 1 part by weight of the vinyl ether monomer, the content of the vinyl ether monomer is 1 to 15% by weight, and the content of the multifunctional (meth)acrylate monomer is 50 to 95% by weight.

For example, JP-T-2008-507598 discloses a radiation curable ink jet ink containing 25.8% by weight of hexanediol diacrylate, 4.6% by weight of an amine adduct of tripropylene glycol diacrylate, 2.3% by weight of 2-(2-ethoxyethoxy)ethyl acrylate, 2.5% by weight of alkoxylated phenoxyethyl acrylate, 3.7% by weight of 2-benzyl-2-(dimethylamino)-4'-morpholinobutyrophenone, 3.2% by weight of 2-hydroxy-2-methylpropiophenone, 2.8% by weight of a mixture of trimethylbenzophenone and methylbenzophenone, 0.5% by weight of isopropylthioxanthone, 27.8% by weight of a cyan pigment dispersant, and 17.6% by weight of 2-(2-vinyloxyethoxy)ethyl acrylate.

For example, JP-A-2010-157706 discloses a curable composition for photo-imprint composed of 9.5% by mass of a monofunctional acrylic monomer (benzyl acrylate), 9.8% by mass of 2-(2-vinyloxyethoxy)ethyl acrylate, 47.3% by mass of a difunctional acrylic monomer (neopentyl glycol diacrylate), 19.4% by mass of a trifunctional acrylic monomer (trimethylol propane triacrylate), 1.0% by mass of a photopolymerization initiator, 2.0% by mass of an antioxidant, 10.0% by mass of a coupling agent, and 1.0% by mass of a surfactant.

Unfortunately, the inks described in Japanese Patent Nos. 3461501 and 3544658, JP-A-2009-62541, JP-T-2008-507598, and JP-A-2010-157706 have problems of being inferior in at least any of curing properties, adhesion, and photopolymerization initiator solubility.

SUMMARY

An advantage of some aspects of the invention is to provide a photocurable ink composition that is excellent in curing property and can prevent occurrence of curing wrinkles.

Another advantage of some aspects of the invention is to provide a photocurable ink jet recording ink composition that is excellent in curing property, adhesion, and photopolymerization initiator solubility.

The inventors have found that the above-mentioned problems can be solved by a photocurable ink composition containing prescribed vinyl ether group-containing (meth)acrylic esters, dipropylene glycol di(meth)acrylate, monofunctional (meth)acrylate having an aromatic ring skeleton, and a coloring material.

That is, a first invention includes the following aspects.

[1] A photocurable ink composition including polymerizable compounds and a photopolymerization initiator, wherein
the polymerizable compounds include:
vinyl ether group-containing (meth)acrylic esters represented by the following Formula (I):

$$CH_2=CR^1-COOR^2-O-CH=CH-R^3 \quad (I)$$

(wherein, $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms);
dipropylene glycol di(meth)acrylate; and
monofunctional (meth)acrylate having an aromatic ring skeleton, and
the ink composition includes a coloring material.

[2] The photocurable ink composition according to aspect [1], wherein the content of the dipropylene glycol di(meth)acrylate is 5 to 65% by mass based on the total mass of the ink composition.

[3] The photocurable ink composition according to aspect [1] or [2], wherein the content of the monofunctional (meth)acrylate having an aromatic ring skeleton is 10 to 60% by mass based on the total mass of the ink composition.

[4] The photocurable ink composition according to any one of aspects [1] to [3], wherein the content of the vinyl ether group-containing (meth)acrylic esters is 10 to 65% by mass based on the total mass of the ink composition.

[5] The photocurable ink composition according to any one of aspects [1] to [4], wherein the photopolymerization initiator is an acylphosphine oxide compound and is contained in an amount of 9 to 15% by mass based on the total mass of the ink composition.

[6] The photocurable ink composition according to any one of aspects [1] to [5], wherein the ink composition is allowed to adhere to a recording medium and is cured by irradiation with light from an ultraviolet light-emitting diode having an emission peak wavelength in a range of 350 to 420 nm.

[7] The photocurable ink composition according to any one of aspects [1] to [6], wherein the ink composition is curable by irradiation with an energy of 300 mJ/cm² or less from an ultraviolet light-emitting diode having an emission peak wavelength in a range of 350 to 420 nm.

[8] The photocurable ink composition according to any one of aspects [1] to [7], wherein the vinyl ether group-containing (meth)acrylic esters are 2-(vinyloxyethoxy)ethyl acrylate.

[9] An ink jet recording method including allowing the photocurable ink composition according to any one of aspects [1] to [8] to adhere to a recording medium and curing the adhering ink composition by irradiation with light from an ultraviolet light-emitting diode having an emission peak wavelength in a range of 350 to 420 nm.

[10] An ink jet recording apparatus for allowing the photocurable ink composition according to any one of aspects [1] to [8] to adhere to a recording medium and curing the adhering ink composition by irradiation with light from an ultraviolet light-emitting diode having an emission peak wavelength in a range of 350 to 420 nm.

The inventors have investigated problems of the inks and the compositions disclosed in the above-mentioned patent documents and also investigated causes of the problems. The active energy ray-curable ink jet printing ink and the reactive diluent composition disclosed in Japanese Patent Nos. 3461501 and 3544658 are particularly inferior in curing property and photopolymerization initiator solubility and have a problem of being slightly inferior in storage stability. The inventors have found that the problems are caused by that the hydroxyl group-containing polymerizable compound contained in the ink deteriorates the storage stability and also hardly contributes to photopolymerization initiator solubility. The ink jet ink disclosed in JP-A-2009-62541 is particularly inferior in curing property and adhesion and has a problem that the viscosity increases and a recorded matter becomes slightly inferior in flexibility. The inventors have found that the problems are caused by that the vinyl ether monomer having only a vinyl ether group as a substituent contained in the ink hardly contributes to the curing properties and that the multifunctional (meth)acrylate monomer is contained too much and thereby deteriorates adhesion and flexibility of a recorded matter and increases the viscosity. The radiation curable ink jet ink disclosed in JP-T-2008-507598 is inferior in curing property, adhesion, and photopolymerization initiator solubility and has problems that the viscosity increases and the abrasion resistance slightly decreases. The inventors have found that the problems are caused by that the amounts of the alkoxylated phenoxyethyl acrylate and the 2-(2-vinyloxyethoxy)ethyl acrylate are low. The curable composition for photo-imprint disclosed in JP-A-2010-157706 has a problems of being inferior in curing property and adhesion. The inventors have found that the problems are mainly caused by that the content of the 2-(2-vinyloxyethoxy)ethyl acrylate is low and thereby the composition of the curable composition for photo-imprint is not suitable as an ink jet ink.

The inventors have found that the above-mentioned problems can be solved by a photocurable ink jet recording ink composition containing vinyl ether group-containing (meth)acrylic esters having a prescribed structure and monofunctional (meth)acrylate having an aromatic ring skeleton in predetermined amounts. Thus, the invention has been accomplished.

That is, a second invention includes the following aspects.

[1] A photocurable ink jet recording ink composition including polymerizable compounds and a photopolymerization initiator, wherein
the polymerizable compounds include:
vinyl ether group-containing (meth)acrylic esters represented by the following Formula (I):

$$CH_2=CR^1-COOR^2-O-CH=CH-R^3 \quad (I)$$

(wherein, $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms) in an amount of 45 to 80% by mass based on the total mass of the ink composition; and
monofunctional (meth)acrylate having an aromatic ring skeleton in an amount of 5 to 40% by mass based on the total mass of the ink composition.

[2] The photocurable ink jet recording ink composition according to aspect [1], wherein the vinyl ether group-containing (meth)acrylic esters are 2-(vinyloxyethoxy)ethyl acrylate.

[3] The photocurable ink jet recording ink composition according to aspect [1] or [2], wherein the photopolymerization initiator is an acylphosphine oxide compound and is contained in an amount of 7% by mass or more based on the total mass of the ink composition.

[4] The photocurable ink jet recording ink composition according to any one of aspects [1] to [3], wherein the content of the photopolymerization initiator is 9% by mass or more based on the total mass of the ink composition.

[5] The photocurable ink jet recording ink composition according to any one of aspects [1] to [4], wherein the monofunctional (meth)acrylate having an aromatic ring skeleton is a compound represented by the following Formula (II) and/or a compound represented by the following Formula (III):

$$CH_2=CR^4-COOR^5-Ar \qquad (II)$$

$$CH_2=CR^4-COO-Ar \qquad (III)$$

($R^4$ in Formulae (II) and (III) represents a hydrogen atom or a methyl group; Ar in Formula (II) represents an aromatic ring skeleton having at least one aryl group where a carbon atom constituting the aryl group is a monovalent organic residue binding to the group represented by $R^5$; $R^5$ represents a divalent organic residue having 1 to 4 carbon atoms; and Ar in Formula (III) represents an aromatic ring skeleton having at least one aryl group where a carbon atom constituting the aryl group is a monovalent organic residue binding to —COO— in the formula).

[6] The photocurable ink jet recording ink composition according to any one of aspects [1] to [5], wherein the polymerizable compounds further include a tri- or more-functional (meth)acrylic monomer in an amount of 3 to 22% by mass based on the total mass of the ink composition.

[7] The photocurable ink jet recording ink composition according to any one of aspects [1] to [6], wherein the polymerizable compounds further include amino (meth)acrylate in an amount of 2 to 22% by mass based on the total mass of the ink composition.

[8] The photocurable ink jet recording ink composition according to any one of aspects [1] to [7], the ink composition having a viscosity at 25° C. of 5 to 15 mPa·s.

[9] An ink jet recording method comprising a discharging step of discharging the photocurable ink jet recording ink composition according to any one of aspects [1] to [8] onto a recording medium; and a curing step of curing the photocurable ink jet recording ink composition discharged in the discharging step by irradiating the photocurable ink jet recording ink composition with ultraviolet light.

DESCRIPTION OF EXEMPLARY EMBODIMENTS

Embodiment according to the first invention will now be described in detail. The invention is not limited to the following embodiments, and various modifications can be made within the scope of the invention.

Throughout the first invention, the term "(meth)acrylate" refers to acrylate and/or methacrylate corresponding to the acrylate, and "(meth)acrylic" refers to acrylic and/or methacrylic corresponding to the acrylic.

Throughout the first invention, the term "curing property" refers to a property of curing upon exposure to light. The term "adhesion" refers to a property that a coating film is hardly detached from a substrate surface. The term "abrasion resistance" refers to a property that a cured material is hardly detached from a recording material when the cured material is rubbed. The term of "storage stability" refers to a property that the viscosity of an ink hardly varies between before and after storage of the ink at 60° C. for one week.

Photocurable Ink Composition

The photocurable ink composition (hereinafter, also simply referred to as "ink composition") according to an embodiment of the invention includes polymerizable compounds and a photopolymerization initiator. The polymerizable compounds include vinyl ether group-containing (meth)acrylic esters represented by the following Formula (I):

$$CH_2=CR^1-COOR^2-O-CH=CH-R^3 \qquad (I)$$

(wherein, $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms), dipropylene glycol di(meth)acrylate, and monofunctional (meth)acrylate having an aromatic ring skeleton, and the ink composition includes a coloring material. Additives (components) that are contained or optionally contained in the ink composition of the embodiment will now be described.

Polymerizable Compounds

The polymerizable compounds contained in the ink composition of the embodiment polymerize by the effect of the photopolymerization initiator described below when irradiated with ultraviolet light to harden the printed ink. Vinyl ether group-containing (meth)acrylic esters The vinyl ether group-containing (meth)acrylic esters, which are polymerizable compounds indispensable in the embodiment, are represented by Formula (I).

An ink composition containing a predetermined amount of the vinyl ether group-containing (meth)acrylic esters can make the curing properties of an ink satisfactory and also can decrease the viscosity of the ink.

In Formula (I), the divalent organic residue having 2 to 20 carbon atoms represented by $R^2$ is preferably an optionally substituted linear, branched, or circular alkylene group having 2 to 20 carbon atoms, an optionally substituted alkylene group having 2 to 20 carbon atoms and an oxygen atom involved in an ether bond and/or an ester bond in its structure, or an optionally substituted divalent aromatic group having 6 to 11 carbon atoms. Among them, more preferred are alkylene groups having 2 to 6 carbon atoms, such as an ethylene group, an n-propylene group, an isopropylene group, and a butylene group; and alkylene group having 2 to 9 carbon atoms and an oxygen atom involved in an ether bond in its structure, such as an oxyethylene group, an oxy-n-propylene group, an oxyisopropylene group, and an oxybutylene group.

In Formula (I), the monovalent organic residue having 1 to 11 carbon atoms represented by $R^3$ is preferably an optionally substituted linear, branched, or circular alkyl group having 1 to 10 carbon atoms or an optionally substituted aromatic group having 6 to 11 carbon atoms. Among them, more preferred are alkyl groups having one or two carbon atoms, such as a methyl group and an ethyl group, and aromatic groups having 6 to 8 carbon atoms, such as a phenyl group and a benzyl group.

When the organic residues have substituents, the substituents are classified into groups containing carbon atoms and groups not containing carbon atoms. In the case of a substituent containing a carbon atom, the carbon atom is counted as the carbon atom of the organic residue. Examples of the group containing a carbon atom include, but not limited to, carboxyl groups and alkoxy groups. Examples of the group not containing a carbon atom include, but not limited to, hydroxyl groups and halo groups.

Examples of the vinyl ether group-containing (meth)acrylic esters include, but not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate.

Among them, 2-(vinyloxyethoxy)ethyl (meth)acrylate, i.e., 2-(vinyloxyethoxy)ethyl acrylate and 2-(vinyloxyethoxy)ethyl methacrylate can notably decrease the viscosity of an ink, have a high flash point, and can provide excellent curing properties to an ink and are therefore preferred. 2-(Vinyloxyethoxy)ethyl acrylate is more preferred. 2-(Vinyloxyethoxy)ethyl (meth)acrylate includes 2-(2-vinyloxyethoxy)ethyl (meth)acrylate and 2-(1-vinyloxyethoxy)ethyl (meth)acrylate. 2-(Vinyloxyethoxy)ethyl acrylate includes 2-(2-vinyloxyethoxy)ethyl acrylate and 2-(1-vinyloxyethoxy)ethyl acrylate. 2-(Vinyloxyethoxy)ethyl acrylate is superior to 2-(vinyloxyethoxy)ethyl methacrylate in the light of curing property.

The content of the vinyl ether group-containing (meth)acrylic esters is preferably 5 to 65% by mass, more preferably 10 to 65% by mass, and most preferably 20 to 65% by mass, based on the total mass (100% by mass) of the ink composition. Within the content range above, the ink can have excellent curing properties, and curing wrinkles can be prevented from occurring. In order to further effectively prevent occurrence of curing wrinkles and to obtain excellent storage stability, the content is preferably 35% by mass or less, more preferably 30% by mass or less, based on the total mass (100% by mass) of the ink composition.

The vinyl ether group-containing (meth)acrylic esters can be produced by, for example, but not limited to, a method (process B) of esterifying (meth)acrylic acid and hydroxyl group-containing vinyl ether; a method (process C) of esterifying a (meth)acrylic acid halide and hydroxyl group-containing vinyl ether; a method (process D) of esterifying a (meth)acrylic anhydride and hydroxyl group-containing vinyl ether; a method (process E) of ester exchanging (meth)acrylic ester and hydroxyl group-containing vinyl ether; a method (process F) of esterifying a (meth)acrylic acid and halogen-containing vinyl ether; a method (process G) of esterifying an alkaline (earth) metal salt of (meth)acrylic acid and halogen-containing vinyl ether; a method (process H) of vinyl exchanging hydroxyl group-containing (meth)acrylic ester and vinyl carboxylate; or a method (process I) of ether exchanging hydroxyl group-containing (meth)acrylic ester and alkyl vinyl ether.

Among these methods, process E can exhibit higher effects desired in the embodiment and is therefore preferred. Polymerizable compound other than vinyl ether group-containing (meth)acrylic esters The ink composition according to the embodiment also contains dipropylene glycol di(meth)acrylate, in addition to the vinyl ether group-containing (meth)acrylic esters. An ink composition containing a predetermined amount of the dipropylene glycol di(meth)acrylate can provide satisfactory curing properties and abrasion resistance and also can prevent occurrence of curing wrinkles. As the dipropylene glycol di(meth)acrylate, dipropylene glycol diacrylate can particularly exhibit higher effects and is more preferred.

The content of the dipropylene glycol di(meth)acrylate is preferably 3 to 70% by mass, more preferably 5 to 65% by mass, and most preferably 10 to 30% by mass, based on the total mass (100% by mass) of the ink composition. Within the content range above, the ink can have excellent curing properties and abrasion resistance, and occurrence of curing wrinkles can be prevented. In order to further improve the adhesion, the content is preferably 30 to 65% by mass and more preferably 30 to 50% by mass.

In addition to the vinyl ether group-containing (meth)acrylic esters and the dipropylene glycol di(meth)acrylate, the ink composition may further contain various known monomers and oligomers, such as monofunctional, difunctional, and tri- or more-functional monomers and oligomers (hereinafter, referred to as "other polymerizable compound"). Examples of the monomer include unsaturated carboxylic acids (e.g., (meth)acrylic acid, itaconic acid, crotonic acid, isocrotonic acid, and maleic acid, and salts and esters thereof), urethanes, amides and anhydrides thereof, acrylonitrile, styrene, various unsaturated polyesters, unsaturated polyethers, unsaturated polyamides, and unsaturated urethanes. Examples of the oligomer include oligomers formed from the monomers mentioned above (e.g., linear acrylic oligomers), epoxy (meth)acrylate, oxetane (meth)acrylate, aliphatic urethane (meth)acrylate, aromatic urethane (meth)acrylate, and polyester (meth)acrylate.

As the other monofunctional monomer or multifunctional monomer, an N-vinyl compound may be used. Examples of the N-vinyl compound include N-vinyl formamide, N-vinyl carbazole, N-vinyl acetamide, N-vinyl pyrrolidone, N-vinylcaprolactam, and acryloylmorpholine, and derivatives thereof.

Among other polymerizable compounds, ester of (meth)acrylic acid, i.e., (meth)acrylate is preferable.

In the (meth)acrylates mentioned above, examples of the monofunctional (meth)acrylate include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate, and dicyclopentenyloxyethyl (meth)acrylate. Among these monofunctional (meth)acrylates, phenoxyethyl (meth)acrylate, in particular, phenoxyethyl acrylate, exhibits good compatibility with the photopolymerization initiator and is therefore preferred.

In the (meth)acrylates mentioned above, examples of the difunctional (meth)acrylate excluding the dipropylene glycol di(meth)acrylate include triethylene di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, EO (ethylene oxide) adduct di(meth)acrylate of bisphenol A, PO (propylene oxide) adduct di(meth)acrylate of bisphenol A, hydroxypivalic acid neopentyl glycol di(meth)acrylate, and polytetramethylene glycol di(meth)acrylate.

In the (meth)acrylates mentioned above, examples of the tri- or more-functional (meth)acrylate include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

Among these compounds, the other polymerizable compound preferably includes monofunctional (meth)acrylate. In such a case, the ink composition can have a low viscosity and high storage stability, and excellent discharge stability can be easily obtained in recording by an ink jet system. Furthermore, a combination use of monofunctional (meth)acrylate, preferably phenoxyethyl (meth)acrylate, and difunctional (meth)acrylate, preferably dipropylene glycol di(meth)acrylate, increases the toughness, heat resistance, and chemical resistance of a coating film, and, therefore, such a use is preferred.

The monofunctional (meth)acrylate preferably has one or more skeletons selected from the group consisting of saturated alicyclic skeletons and unsaturated alicyclic skeletons. Examples of the monofunctional (meth)acrylate having a saturated alicyclic skeleton include isobornyl (meth)acrylate, t-butylcyclohexyl (meth)acrylate, and dicyclopentanyl (meth)acrylate. Examples of the monofunctional (meth)acrylate having an unsaturated alicyclic skeleton include dicyclopentenyloxyethyl (meth)acrylate. When the other polymerizable compound is the monofunctional (meth)acrylate having the skeleton mentioned above, the ink composition can have a low viscosity.

The ink composition of the embodiment further contains monofunctional (meth)acrylate having an aromatic ring skeleton. Examples of the monofunctional (meth)acrylate having an aromatic ring skeleton include phenoxyethyl (meth)acrylate, 2-hydroxy-3-phenoxypropyl (meth)acrylate, benzyl (meth)acrylate, phenoxydiethylene glycol (meth)acrylate, nonylphenoxyethyl (meth)acrylate, and alkoxylated phenoxyethyl (meth)acrylate. The ink composition containing the monofunctional (meth)acrylate having an aromatic ring skeleton exhibits good compatibility with additives such as the photopolymerization initiator, has satisfactory curing properties, and is prevented from occurrence of curing wrinkles.

Among these compounds, from the viewpoints of the curing properties and the initiator solubility, phenoxyethyl (meth)acrylate, 2-hydroxy-3-phenoxypropyl (meth)acrylate, and benzyl (meth)acrylate are preferred. Phenoxyethyl acrylate exhibits good compatibility with additives such as the photopolymerization initiator and can decrease viscosity and odor and is therefore preferred.

The content of the monofunctional (meth)acrylate having an aromatic ring skeleton is preferably 5 to 70% by mass, more preferably 10 to 60% by mass, more preferably 10 to 60% by mass, more preferably 10 to 45% by mass, more preferably 10 to 30% by mass, and most preferably 10 to 25% by mass, based on the total mass (100% by mass) of the ink composition. Within the content range above, the compatibility with additives such as the photopolymerization initiator can be further increased.

In the case where the ink composition of the embodiment contains a polymerizable compound in addition to the vinyl ether group-containing (meth)acrylic esters, the dipropylene glycol di(meth)acrylate, and the monofunctional (meth)acrylate having an aromatic ring skeleton, the content of the polymerizable compound is preferably 40% by mass or less, more preferably 20 to 40% by mass, based on the total mass (100% by mass) of the ink composition. Within the content range above, the solubility of the additives is excellent, and a coating film having high toughness, heat resistance, and chemical resistance can be formed.

The polymerizable compounds may be used alone or in a combination of two or more thereof.

Photopolymerization Initiator

The photopolymerization initiator contained in the ink composition of the embodiment allows an ink present on a recording medium surface to cure by photopolymerization under ultraviolet irradiation to achieve printing. In radiation, ultraviolet (UV) is excellent in safety, and the light source lamp thereof is inexpensive. The photopolymerization initiator may be any one that generates active species such as radicals and cations by light (ultraviolet) energy and thereby initiates polymerization of the polymerizable compound. For example, a photo-radial polymerization initiator or a photo-cation polymerization initiator can be used. The photo-radial polymerization initiator is particularly preferred.

Examples of the photo-radial polymerization initiator include aromatic ketones, acylphosphine oxide compounds, aromatic onium salt compounds, organic peroxides, thio compounds (e.g., thioxanthone compounds and thiophenyl group-containing compounds), hexaarylbiimidazole compounds, ketoxime ester compounds, borate compounds, azinium compounds, metallocene compounds, active ester compounds, compounds having carbon-halogen bonds, and alkylamine compounds.

Among these compounds, in particular, the acylphosphine oxide compound and the thioxanthone compound can improve the curing properties of an ink, and at least one of them, in particular, the acylphosphine oxide compound is preferred. When the ink composition of the embodiment contains the acylphosphine oxide compound, the content thereof is preferably 7 to 15% by mass, more preferably 9 to 15% by mass, based on the total mass (100% by mass) of the ink composition. Within this content range, the solubility of the compound in the ink composition is satisfactory, and the ink composition can have excellent curing properties.

More preferred is to contain both the acylphosphine oxide compound and the thioxanthone compound as the photo-radial polymerization initiator.

Specific examples of the photo-radial polymerization initiator include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-tiemethylpentylphosphine oxide.

Examples of commercially available photo-radial polymerization initiator include IRGACURE 651 (2,2-dimethoxy-1,2-diphenylethan-1-one), IRGACURE 184 (1-hydroxy-cyclohexyl-phenyl-ketone), 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl]-2-methyl-propan-1-one}), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (oxyphenylacetic acid, 2-[2-oxo-2-phenylacetoxyethoxy]ethyl ester, and a mixture of oxyphenylacetic acid and 2-(2-hydroxyethoxy)ethyl ester) (each manufactured by BASF), KAYACURE DETX-S (2,4-diethylthioxanthone) (manufactured by Nippon Kayaku Co., Ltd.), Lucirin TPO, LR8893, and LR8970 (each manufactured by BASF), and Ubecryl P36 (manufactured by UCB).

The photopolymerization initiators may be used alone or in a combination of two or more thereof.

In order to sufficiently accelerate ultraviolet curing speed and, at the same time, to avoid insufficient dissolution of the photopolymerization initiator and avoid coloring due to the photopolymerization initiator, the content of the photopolymerization initiator is preferably 1 to 20% by mass, more preferably 5 to 15% by mass, based on the total mass (100% by mass) of the ink composition.

Coloring Material

The ink composition of the embodiment further contains a coloring material. The coloring material can be a pigment and/or a dye.

Pigment

In the embodiment, the use of a pigment as the coloring material can increase the light resistance of the ink composition. The pigment may be an inorganic pigment or an organic pigment.

As the inorganic pigment, for example, carbon blacks (e.g., C.I. Pigment Black 7), such as furnace black, lamp black, acetylene black, and channel black; iron oxide; and titanium oxide can be used.

Examples of the organic pigment include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye chelates and acid dye chelates); dye lakes (e.g., basic dye lakes and acid dye lakes); and nitro pigments, nitroso pigments, aniline black, and daylight fluorescent pigments.

More specifically, examples of the carbon black used in black inks include No. 2300, No. 900, MCF88, No. 33, No. 40, No. 45, No. 52, MA7, MA8, MA100, and No. 2200B (trade names of products manufactured by Mitsubishi Chemical Corporation); Raven 5750, Raven 5250, Raven 5000, Raven 3500, Raven 1255, and Raven 700 (trade names of products manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (trade names of products manufactured by CABOT JAPAN K.K.); and Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, and Special Black 4 (trade names of products manufactured by Degussa).

Examples of the pigment used in white inks include C.I. Pigment White 6, 18, and 21.

Examples of the pigment used in yellow inks include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in magenta inks include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of the pigment used in cyan inks include C.I. Pigment Blue 1, 2, 3, 15, 15:1, 15:2, 15:3, 15:34, 15:4, 16, 18, 22, 25, 60, 65, and 66; and C.I. Vat Blue 4 and 60.

Examples of the pigment other than magenta, cyan, and yellow pigments include C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

These pigments may be used alone or in a combination of two or more thereof.

Dye

In the embodiment, the coloring material may be a dye. Any dye, such as acid dyes, direct dyes, reactive dyes, and basic dyes, can be used. Examples of the dye include C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

These dyes may be used alone or in a combination of two or more thereof.

The content of the coloring material is preferably 1 to 20% by mass based on the total mass (100% by mass) of the ink composition. Within the content range, satisfactory color-developing properties can be obtained, and prevention of curing of a coating film due to light absorption by the coloring material itself can be decreased.

The ink composition of the embodiment can color a recording medium by containing the coloring material mentioned above and thereby can perform recording on the recording medium. Though the ink composition of the embodiment contains a coloring material, the ink composition can have excellent curing properties, adhesion, and abrasion resistance, and occurrence of curing wrinkles can be prevented.

Dispersant

When the ink composition of the embodiment contains a pigment, the ink composition may further contain a dispersant for well dispersing the pigment. Any dispersant can be used. For example, a dispersant that is commonly used for preparing a pigment-dispersed liquid, such as a polymer dispersant, can be used. Specific examples of such a dispersant include those of which main component is at least one selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. Examples of commercially available polymer dispersants include Ajisper series (trade name) manufactured by Ajinomoto Fine-Techno, Solsperse series (e.g., Solsperse 36000 (trade name) available from Avecia Co.), Disperbyk series (trade name) manufactured by BYK Chemie, and Disparlon series (trade name) manufactured by Kusumoto Chemicals.

Other Additives

The ink composition of the embodiment may contain additives (components) in addition to the above-described additives. Such components are not particularly limited. For example, generally known surfactant, polymerization inhibitor, penetration accelerator, and wetting agent (moisturizing agent), and other additives can be used. Examples of the other additive include generally known fixing agent, antifungal agent, preservative, antioxidant, UV absorber, chelating agent, pH adjuster, and thickener.

Recording Medium

The ink composition of the embodiment is discharged on a recording medium by a recording method described below to form a recorded matter. The recording medium may be absorbable or nonabsorbable. The recording method of the embodiment described below can be widely applied to various recording media exhibiting highly different degrees of absorbability, i.e., from non-absorbing media into which aqueous ink hardly permeates to absorbing media into which aqueous ink easily permeates. In the case of applying the ink composition to a non-absorbing recording medium, for example, a drying step may be required after curing the ink composition by exposure to ultraviolet light.

Any absorbing recording medium can be used, and examples thereof include plain paper such as electrophotographic paper highly absorbing aqueous inks, ink jet paper (special paper for ink jet printing and having an ink absorbing layer containing silica particles or alumina particles or an ink absorbing layer made of a hydrophilic polymer such as polyvinyl alcohol (PVA) or polyvinyl pyrrolidone (PVP)), and paper showing relatively low absorbability for aqueous inks and used in ordinary offset printing, such as art paper, coated paper, and cast-coated paper.

Any non-absorbing recording medium can be used, and examples thereof include films and plates of plastics such as polyvinyl chloride (PVC), polyethylene, polypropylene, and polyethylene terephthalate (PET); plates of metals such as iron, silver, copper, and aluminum; metal plates coated with such various metals by vapor deposition; plastic films; and plates of alloys such as stainless steel and brass.

Recording Method

An embodiment of the invention relates to a recording method. The photocurable ink composition according to the embodiment described above can be used in the recording method of this embodiment. The recording method can be applied to an ink jet system. The recording method includes a discharging step of discharging the above-described ink composition onto a recording medium; and a curing step of curing the ink composition discharged in the discharging step by irradiating the ink composition with ultraviolet light. The ink composition thus cured on the recording medium forms a coating film (cured film).

As the method of allowing the ink composition to adhere to a recording medium, various plate printing systems can be employed as well as the ink jet system. The ink jet system can use a small-sized recording apparatus, can be applied to on-demand printing, and can record highly fine images with high resolution and is therefore preferred.

Discharging Step

In the discharging step, an ink composition is discharged onto a recording medium so that the ink composition adheres to the recording medium. The ink composition at the time of being discharged preferably has a viscosity of 5 to 30 mPa·s. In the case of an ink composition having such a viscosity at room temperature or in a non-heated state, the ink composition may be discharged at room temperature or without heating. Alternatively, an ink composition may be heated to a predetermined temperature to adjust the viscosity to a proper level and may be then discharged. Thus, satisfactory discharge stability is achieved.

The photocurable ink composition of the embodiment has a higher viscosity than those of ordinary aqueous ink compositions. The viscosity therefore largely varies depending on changes in temperature when the ink composition is discharged. The change in viscosity of the ink highly affects the sizes of droplets and the droplet-discharging speed, which may cause deterioration in image quality. Accordingly, it is preferred to maintain the temperature of the ink at the time of being discharged as constant as possible.

Curing Step

Subsequently, the ink composition discharged and adhering to the recording medium is cured by light (ultraviolet) irradiation in the curing step. This is caused by that the photopolymerization initiator contained in the ink composition is decomposed by ultraviolet irradiation to generate initiation species such as radicals, acids, or bases and that polymerization of the polymerizable compound is accelerated by the function of the initiation species, or is caused by that polymerization of the polymerizable compound starts by ultraviolet irradiation. If the ink composition contains a sensitizing dye together with the photopolymerization initiator, the sensitizing dye in the system absorbs ultraviolet light and thereby changes to an excited state, which accelerates decomposition of the photopolymerization initiator by contact therewith. As a result, more sensitive curing reaction is achieved.

As the ultraviolet light source, a mercury lamp or a gas/solid laser is mainly used. As light sources for curing photocurable ink compositions, mercury lamps and metal halide lamps are widely used. However, from the viewpoint of environmental protection, it is highly desired to be mercury-free, and replacement by GaN-based semiconductor ultraviolet light emitting devices is very useful industrially and environmentally. In addition, ultraviolet light-emitting diodes (UV-LEDs) and ultraviolet light-emitting laser diodes (UV-LDs) are small-sized and have long life and high efficiency and are low in cost, power consumption, and heat generation, and are therefore expected as light sources for photocurable ink jet recording. Among them, UV-LEDs are preferred. Hereinafter, UV-LED and UV-LD are collectively referred to as an ultraviolet light-emitting diode. The use of the ultraviolet light-emitting diode has advantages mentioned above as a light source, but tends to decrease the curing properties of an ink composition and to cause curing wrinkles.

When a UV-LED preferably having an emission peak wavelength in a range of 350 to 420 nm is used, a preferred photocurable ink composition is curable by irradiation with an energy of, preferably, 300 mJ/cm$^2$ or less, more preferably 200 mJ/cm$^2$ or less, and most preferably 150 mJ/cm$^2$ or less. In such a case, a high printing speed can be obtained at low cost. Such an ink composition can be obtained by containing a photopolymerization initiator that is decomposed by exposure to ultraviolet light having a wavelength in the above-mentioned range and/or a polymerizable compound that starts polymerization by exposure to ultraviolet light having a wavelength in the above-mentioned range.

Recording Apparatus

An embodiment of the invention relates to a recording apparatus. The recording apparatus performs recording by the above-described recording method on a recording medium and preferably includes a device for allowing an ink composition to adhere to a recording medium and a light source for irradiating the adhering ink composition with light to cause curing of the ink. The photocurable ink composition of the above-described embodiment can be used in the recording apparatus of this embodiment. The recording apparatus can be preferably applied to an ink jet system.

Thus, according to the embodiment, it is possible to provide a photocurable ink composition that has excellent curing properties, can prevent occurrence of curing wrinkles, and also has high adhesion, abrasion resistance, and storage stability and to provide a recording method and a recording apparatus using the ink composition.

Embodiments according to the second invention will now be described in detail. The invention is not limited to the following embodiments, and various modifications can be made within the scope of the invention.

Throughout the second invention, the term "(meth)acrylate" refers to acrylate and/or methacrylate corresponding to the acrylate, and "(meth)acrylic" refers to acrylic and/or methacrylic corresponding to the acrylic.

Throughout the second invention, the term "curing" refers to that an ink containing a polymerizable compound solidifies by polymerization of the polymerizable compound by exposure to radiation. The term "curing property" refers to a property of curing upon exposure to light. The term "adhesion" refers to a property that a coating film of an ink is hardly detached from a substrate surface and particularly, in Examples below, refers to such a property when a rectangular lattice pattern is cut into a cured material so as to reach the surface of the recording medium. The term "abrasion resistance" refers to a property that a cured material is hardly detached from a recording material when the cured material is scratched. The term of "storage stability" refers to a property that the viscosity of an ink hardly varies between before and after storage of the ink at 60° C. for one week.

Throughout the second invention, the term "recorded matter" refers to a cured material formed by an ink recorded on a recording medium. The cured material in the second invention means a hardened material including a cured film and a coating film of an ink.

Photocurable Ink Jet Recording Ink Composition

The photocurable ink jet recording ink composition (hereinafter, also simply referred to as "ink composition") according to an embodiment of the invention includes polymerizable compounds and a photopolymerization initiator. The polymerizable compounds include vinyl ether group-containing (meth)acrylic esters represented by the following Formula (I):

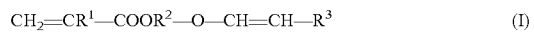

$$CH_2=CR^1-COOR^2-O-CH=CH-R^3 \qquad (I)$$

(wherein, R$^2$ represents a hydrogen atom or a methyl group; R$^2$ represents a divalent organic residue having 2 to 20 carbon atoms; and R$^3$ represents a hydrogen atom or a monovalent organic residue having 1 to 11 carbon atoms) and monofunctional (meth)acrylate having an aromatic ring skeleton, at predetermined amounts.

Additives (components) that are contained or optionally contained in the ink composition of the embodiment will now be described.

Polymerizable Compounds

The polymerizable compounds contained in the ink composition of the embodiment polymerize by the effect of the photopolymerization initiator described below when irradiated with ultraviolet light to harden the printed ink.

Vinyl Ether Group-Containing (Meth)Acrylic Esters

The vinyl ether group-containing (meth)acrylic esters, which are polymerizable compounds indispensable in the embodiment, are represented by Formula (I).

An ink composition containing a predetermined amount of the vinyl ether group-containing (meth)acrylic esters can make the curing properties of an ink satisfactory and also can decrease the viscosity of the ink. Furthermore, the curing properties of an ink when a compound having both a vinyl ether group and a (meth)acrylic group in a single molecule is used is higher than those when a compound having a vinyl ether group and a compound having a (meth)acrylic group are used.

In Formula (I), the divalent organic residue having 2 to 20 carbon atoms represented by R$^2$ is preferably an optionally substituted linear, branched, or circular alkylene group having 2 to 20 carbon atoms, an optionally substituted alkylene group having 2 to 20 carbon atoms and an oxygen atom involved in an ether bond and/or an ester bond in its structure, or an optionally substituted divalent aromatic group having 6 to 11 carbon atoms. Among them, more preferred are alkylene groups having 2 to 6 carbon atoms, such as an ethylene group, an n-propylene group, an isopropylene group, and a butylene group; and alkylene group having 2 to 9 carbon atoms and an oxygen atom involved in an ether bond in its structure, such as an oxyethylene group, an oxy-n-propylene group, an oxyisopropylene group, and an oxybutylene group.

In Formula (I), the monovalent organic residue having 1 to 11 carbon atoms represented by $R^3$ is preferably an optionally substituted linear, branched, or circular alkyl group having 1 to 10 carbon atoms or an optionally substituted aromatic group having 6 to 11 carbon atoms. Among them, more preferred are alkyl groups having 1 or 2 carbon atoms, such as a methyl group and an ethyl group, and aromatic groups having 6 to 8 carbon atoms, such as a phenyl group and a benzyl group.

When the organic residues have substituents, the substituents are classified into groups containing carbon atoms and groups not containing carbon atoms. In the case of a substituent containing a carbon atom, the carbon atom is counted as the carbon atom of the organic residue. Examples of the group containing a carbon atom include, but not limited to, carboxyl groups and alkoxy groups. Examples of the group not containing a carbon atom include, but not limited to, hydroxyl groups and halo groups.

Examples of the vinyl ether group-containing (meth) acrylic esters include, but not limited to, 2-vinyloxyethyl (meth)acrylate, 3-vinyloxypropyl (meth)acrylate, 1-methyl-2-vinyloxyethyl (meth)acrylate, 2-vinyloxypropyl (meth) acrylate, 4-vinyloxybutyl (meth)acrylate, 1-methyl-3-vinyloxypropyl (meth)acrylate, 1 vinyloxymethylpropyl (meth) acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy) propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth) acrylate, polyethylene glycol monovinyl ether (meth)acrylate, and polypropylene glycol monovinyl ether (meth) acrylate.

Among them, 2-(vinyloxyethoxy)ethyl (meth)acrylate, i.e., 2-(vinyloxyethoxy)ethyl acrylate and/or 2-(vinyloxyethoxy)ethyl methacrylate, can notably decrease the viscosity of an ink, has a high flash point, and can provide excellent curing properties to an ink, and is therefore preferred. 2-(Vinyloxyethoxy)ethyl acrylate is more preferred. In particular, both 2-(vinyloxyethoxy)ethyl acrylate and 2-(vinyloxyethoxy)ethyl methacrylate have simple structures, have low molecular weights, and thereby can notably decrease the viscosity of an ink. 2-(Vinyloxyethoxy)ethyl (meth)acrylate includes 2-(2-vinyloxyethoxy)ethyl (meth)acrylate and 2-(1-vinyloxyethoxy)ethyl (meth)acrylate. 2-(Vinyloxyethoxy)ethyl acrylate includes 2-(2-vinyloxyethoxy)ethyl acrylate and 2-(1-vinyloxyethoxy)ethyl acrylate. 2-(Vinyloxyethoxy)ethyl acrylate is superior to 2-(vinyloxyethoxy) ethyl methacrylate in the light of curing property.

The content of the vinyl ether group-containing (meth) acrylic esters is 45 to 80% based on the total mass (100% by mass) of the ink composition. A content of 45% by mass or more can provide excellent adhesion and satisfactory curing properties and abrasion resistance. A content of 80% by mass or less provides high photopolymerization initiator solubility and satisfactory abrasion resistance. In order to obtain further excellent adhesion, abrasion resistance, and photopolymerization initiator solubility, the content is preferably 47 to 77% by mass, more preferably 52 to 72% by mass, based on the total mass (100% by mass) of the ink composition.

The vinyl ether group-containing (meth)acrylic esters can be produced by, for example, but not limited to, a method (process B) of esterifying (meth)acrylic acid and hydroxyl group-containing vinyl ether; a method (process C) of esterifying a (meth)acrylic acid halide and hydroxyl group-containing vinyl ether; a method (process D) of esterifying a (meth)acrylic anhydride and hydroxyl group-containing vinyl ether; a method (process E) of ester exchanging (meth)acrylic ester and hydroxyl group-containing vinyl ether; a method (process F) of esterifying a (meth)acrylic acid and halogen-containing vinyl ether; a method (process G) of esterifying an alkaline (earth) metal salt of (meth) acrylic acid and halogen-containing vinyl ether; a method (process H) of vinyl exchanging hydroxyl group-containing (meth)acrylic ester and vinyl carboxylate; or a method (process I) of ether exchanging hydroxyl group-containing (meth)acrylic ester and alkyl vinyl ether.

Among these methods, process E can exhibit higher effects desired in the embodiment and is therefore preferred. Monofunctional (meth)acrylate having an aromatic ring skeleton)

The ink composition of the embodiment contains monofunctional (meth)acrylate having an aromatic ring skeleton in addition to the vinyl ether group-containing (meth)acrylic esters. The ink composition containing the monofunctional (meth)acrylate having an aromatic ring skeleton exhibits excellent curing properties, abrasion resistance, and photopolymerization initiator solubility.

The monofunctional (meth)acrylate having an aromatic ring skeleton is a compound having an aromatic ring skeleton and also one (meth)acryloyl group as a polymerizable functional group in one molecule. Examples of the monofunctional (meth)acrylate having an aromatic ring skeleton include, but not limited to, benzyl (meth)acrylate, phenoxyethyl (meth)acrylate, alkoxylated 2-phenoxyethyl (meth) acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth)acrylate. Examples of commercially available monofunctional (meth)acrylate having an aromatic ring skeleton include Viscoat #192 (trade name of phenoxyethyl acrylate manufactured by Osaka Organic Chemical Industry Ltd.); and SR340 (phenoxyethyl methacrylate), SR339A (phenoxyethyl acrylate), SR504 (ethoxylated nonylphenyl acrylate), CD614 (alkoxylated nonylphenyl acrylate), and CD9087 (alkoxylated 2-phenoxyethyl acrylate) (trade names of products manufactured by Sartomer Company Inc.).

Among these compounds, preferred are compounds represented by the following Formula (II) or (III):

$$CH_2=CR^4-COOR^5-Ar \quad (II)$$

$$CH_2=CR^4-COO-Ar \quad (III)$$

($R^4$ in Formulae (II) and (III) represents a hydrogen atom or a methyl group; Ar in Formula (II) represents an aromatic ring skeleton having at least one aryl group where a carbon atom constituting the aryl group is a monovalent organic residue binding to the group represented by $R^5$; $R^5$ represents a divalent organic residue having 1 to 4 carbon atoms; and Ar in Formula (III) represents an aromatic ring skeleton having at least one aryl group where a carbon atom constituting the aryl group is a monovalent organic residue binding to —COO— in the formula).

In Formula (II), the organic residue represented by $R^5$ is preferably an optionally substituted linear, branched, or circular alkylene group having 1 to 4 carbon atoms or an optionally substituted alkylene group having 1 to 4 carbon atoms and an oxygen atom involved in an ether bond and/or an ester bond in its structure. Among them, more preferred are alkylene groups having 1 to 4 carbon atoms, such as an ethylene group, an n-propylene group, an isopropylene group, and a butylene group; and alkylene group having 1 to 4 carbon atoms and an oxygen atom involved in an ether bond in its structure, such as an oxyethylene group, an oxy-n-propylene group, an oxyisopropylene group, and an oxybutylene group. When the organic residues have substituents, examples of the substituents include, but not limited to, carboxyl groups, alkoxy groups, hydroxyl groups, and halo groups. In the case of a substituent containing a carbon atom, the carbon atom is counted as the carbon atom of the organic residue.

Ar (aromatic ring skeleton) in Formulae (II) and (III) includes at least one aryl group. Examples of the aryl group include, but not limited to, phenyl groups and naphthyl groups. The number of the aryl group is at least one and preferably one or two. The aryl group may be substituted on a carbon atom constituting the group excluding the carbon atom binding to the organic residue represented by $R^5$ in Formula (II), the carbon atom binding to —COO— in Formula (III), and the carbon atoms binding between aryl groups in the case of Ar having two or more aryl groups. When the aryl group is substituted, the number of the substituents is at least one, preferably one or two, for each aryl group. Examples of the substituent include, but not limited to, linear, branched, or circular alkylene and alkoxy groups having 1 to 10 carbon atoms, carboxyl groups, halo groups, and hydroxyl groups.

Among them, phenoxyethyl (meth)acrylate, more preferably phenoxyethyl acrylate, exhibits good compatibility with additives such as the photopolymerization initiator, can decrease viscosity and odor, provides further excellent reactivity (curing property), and is therefore preferred.

The content of the monofunctional (meth)acrylate having an aromatic ring skeleton is 5 to 40% by mass based on the total mass of the ink composition (100% by mass). A content of 5% by mass or more can provide excellent curing properties and photopolymerization initiator solubility and satisfactory abrasion resistance. A content of 40% by mass or less provides excellent adhesion and abrasion resistance and also satisfactory curing properties. In order to obtain higher photopolymerization initiator solubility, the content is preferably 10 to 40% by mass, more preferably 12 to 33% by mass.

Polymerizable Compound Other than the Above

In addition to the vinyl ether group-containing (meth)acrylic esters and the monofunctional (meth)acrylate having an aromatic ring skeleton, the ink composition may further contain various known monomers and oligomers, such as monofunctional, difunctional, and tri- or more-functional monomers and oligomers (hereinafter, referred to as "other polymerizable compound"). Examples of the monomer include unsaturated carboxylic acids (e.g., (meth)acrylic acid, itaconic acid, crotonic acid, isocrotonic acid, and maleic acid, salts and esters thereof), urethanes, amides and anhydrides thereof, acrylonitrile, styrene, various unsaturated polyesters, unsaturated polyethers, unsaturated polyamides, and unsaturated urethanes. Examples of the oligomer include oligomers formed from the monomers mentioned above (e.g., linear acrylic oligomers), epoxy (meth)acrylate, oxetane (meth)acrylate, aliphatic urethane (meth)acrylate, aromatic urethane (meth)acrylate, and polyester (meth)acrylate.

As the other monofunctional monomer or multifunctional monomer, an N-vinyl compound may be used. Examples of the N-vinyl compound include N-vinyl formamide, N-vinyl carbazole, N-vinyl acetamide, N-vinyl pyrrolidone, N-vinylcaprolactam, and acryloylmorpholine, and derivatives thereof.

Among other polymerizable compounds, ester of (meth)acrylic acid, i.e., (meth)acrylate is preferable.

Among the (meth)acrylates mentioned above, examples of the monofunctional (meth)acrylate excluding those having an aromatic ring skeleton include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, isobornyl (meth)acrylate, 2-hydroxyethyl (meth)acrylate, 2-hydroxypropyl (meth)acrylate, lactone-modified flexible (meth)acrylate, tetrahydrofurfuryl (meth)acrylate, t-butylcyclohexyl (meth)acrylate, dicyclopentanyl (meth)acrylate, and dicyclopentenyloxyethyl (meth)acrylate.

Among the (meth)acrylates mentioned above, examples of difunctional (meth)acrylate include triethylene di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, EO (ethylene oxide) adduct di(meth)acrylate of bisphenol A, PO (propylene oxide) adduct di(meth)acrylate of bisphenol A, hydroxypivalic acid neopentyl glycol di(meth)acrylate, and polytetramethylene glycol di(meth)acrylate.

Among the (meth)acrylates mentioned above, examples of tri- or more-functional (meth)acrylate include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

Among these compounds, in order to further increase the strength of a coating film and obtain further excellent abrasion resistance, the other polymerizable compound preferably contains tri- or more-functional (meth)acrylate, i.e., a tri- or more-functional (meth)acrylic monomer, more preferably a trifunctional (meth)acrylic monomer.

In the case where the ink composition of the embodiment contains a polymerizable compound in addition to the vinyl ether group-containing (meth)acrylic esters and the monofunctional (meth)acrylate having an aromatic ring skeleton, the content of the polymerizable compound is preferably 3 to 30% by mass, more preferably 5 to 20% by mass, based on the total mass (100% by mass) of the ink composition. Within the content range above, the solubility of the additives is excellent, and a coating film having high toughness, heat resistance, and chemical resistance can be formed.

In particular, when the ink composition further contains a trifunctional (meth)acrylic monomer, the content of the trifunctional (meth)acrylic monomer is preferably 3 to 22% by mass, more preferably 3 to 17% by mass, based on the total mass (100% by mass) of the ink composition. Within the content range above, the solubility of the additives such as the photopolymerization initiator is further excellent, and the viscosity can be further decreased.

The polymerizable compounds may be used alone or in a combination of two or more thereof.

Photopolymerization Initiator

The photopolymerization initiator contained in the ink composition of the embodiment allows an ink present on a recording medium surface to cure by photopolymerization under ultraviolet irradiation to achieve printing. In radiation, ultraviolet (UV) is excellent in safety, and the light source lamp thereof is inexpensive. The photopolymerization initiator may be any one that generates active species such as radicals and cations by light (ultraviolet) energy and thereby initiates polymerization of the polymerizable compound. For example, a photo-radial polymerization initiator or a photo-cation polymerization initiator can be used. In particular, the photo-radial polymerization initiator is preferred.

Examples of the photo-radial polymerization initiator include aromatic ketones, acylphosphine oxide compounds, aromatic onium salt compounds, organic peroxides, thio compounds (e.g., thioxanthone compounds and thiophenyl group-containing compounds), hexaarylbiimidazole compounds, ketoxime ester compounds, borate compounds, azinium compounds, metallocene compounds, active ester compounds, compounds having carbon-halogen bonds, and alkylamine compounds.

In particular, the acylphosphine oxide compound can make the curing properties of an ink satisfactory and is therefore preferred. More preferred is to contain both the acylphosphine oxide compound and the thioxanthone compound.

Specific examples of the photo-radial polymerization initiator include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-tiemethylpentylphosphine oxide.

Examples of commercially available photo-radial polymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one}), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl) titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (oxyphenylacetic acid, 2-[2-oxo-2-phenylacetoxyethoxy]ethyl ester, and a mixture of oxyphenylacetic acid and 2-(2-hydroxyethoxy)ethyl ester) (each manufactured by BASF), KAYACURE DETX-S (2,4-diethylthioxanthone) (manufactured by Nippon Kayaku Co., Ltd.), Lucirin TPO, LR8893, and LR8970 (each manufactured by BASF), and Ubecryl P36 (manufactured by UCB).

The photopolymerization initiators may be used alone or in a combination of two or more thereof.

In order to sufficiently accelerate ultraviolet curing speed and, at the same time, to avoid insufficient dissolution of the photopolymerization initiator and avoid coloring due to the photopolymerization initiator, the content of the photopolymerization initiator is preferably 9% by mass or more, more preferably 9 to 17% by mass, based on the total mass (100% by mass) of the ink composition.

When the photopolymerization initiator includes the acylphosphine oxide compound, in order to obtain a sufficiently high curing speed, in particular, in curing with an LED (350 to 420 nm) and to thereby obtain further excellent curing properties, the content of the acylphosphine oxide compound is preferably 7% by mass or mass, more preferably 7 to 15% by mass, and in order to obtain further excellent curing properties, most preferably 10 to 15% by mass, based on the total mass (100% by mass) of the ink composition.

Polymerization Accelerator

The ink composition of the embodiment may contain a polymerization accelerator. Examples of the polymerization accelerator include, but not limited to, p-dimethylaminobenzoic acid esters and amino (meth)acrylate.

Among them, amino (meth)acrylate has excellent reactivity, in particular, can make curing properties of a thin film satisfactory, and is therefore preferred. The amino (meth)

acrylate is a compound having at least one amino group and at least one (meth)acryloyl group. Preferred examples of the amino (meth)acrylate include, but not limited to, compounds obtained by reaction of an amine compound and at least one of monofunctional (meth)acrylate, difunctional (meth)acrylate, and tri- or more-functional (meth)acrylate.

Examples of commercially available amino (meth)acrylate include CN371 (trade name of a compound containing two amino groups and two acryloyl groups manufactured by Sartomer Company Inc.); EBECRYL 7100 (trade name of a compound containing two amino groups and two acryloyl groups manufactured by Cytech, Inc.); and CN386 (compound containing two amino groups and one acryloyl group), CN372 (compound containing one amino group and one acryloyl group), CN373 (compound containing one amino group and two acryloyl groups), CN383 (compound containing one amino group and one acryloyl group), and CN374 (compound containing two amino groups and one acryloyl group) (trade names of products manufactured by Sartomer Company Inc.).

The polymerization accelerators may be used alone or in a combination of two or more thereof.

The content of the polymerization accelerator, in particular, the amino (meth)acrylate is preferably 2 to 22% by mass based on the total mass (100% by mass) of the ink composition. Within this content range, the thin film curing properties are further improved. The "thin film" in the thin film curing properties is a film having a thickness of 3 μm or less, more specifically, a film having a thickness of 1 to 2 μm.

Polymerization Inhibitor

The ink composition of the embodiment may contain a polymerization inhibitor. Examples of the polymerization inhibitor include, but not limited to, phenol compounds such as p-methoxyphenol, cresol, t-butylcatechol, di-t-butyl para-cresol, hydroquinone monomethyl ether, α-naphthol, 3,5-di-t-butyl-4-hydroxytoluene, 2,2'-methylene bis(4-methyl-6-t-butylphenol), 2,2'-methylene bis(4-ethyl-6-butylphenol), and 4,4'-thiobis(3-methyl-6-t-butylphenol); quinone compounds such as p-benzoquinone, anthraquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, 2,5-di-butyl-hydroquinone, mono-t-butylhydroquinone, monomethylhydroquinone, and 2,5-di-t-amylhydroquinone; amine compounds such as phenyl-β-naphthylamine, p-benzylaminephenol, di-β-naphthyl paraphenyldiamine, dibenzyl hydroxylamine, phenyl hydroxylamine, and diethyl hydroxylamine; nitro compounds such as dinitrobenzene, trinitrotoluene, and picric acid; oxime compounds such as quinone dioxime and cyclohexanone oxime; and sulfur compounds such as phenothiazine.

The polymerization inhibitors may be used alone or in a combination of two or more thereof. The amount of the polymerization inhibitor is not particularly limited, and an approximate amount thereof may be added.

Coloring Material

The ink composition of the embodiment further contains a coloring material. The coloring material can be a pigment and/or a dye.

Pigment

In the embodiment, the use of a pigment as the coloring material can increase the light resistance of the ink composition. The pigment may be an inorganic pigment or an organic pigment.

As the inorganic pigment, for example, carbon blacks (e.g., C.I. Pigment Black 7), such as furnace black, lamp black, acetylene black, and channel black; iron oxide; and titanium oxide can be used.

Examples of the organic pigment include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye chelates and acid dye chelates); dye lakes (e.g., basic dye lakes and acid dye lakes); and nitro pigments, nitroso pigments, aniline black, and daylight fluorescent pigments.

More specifically, examples of the carbon black used in black inks include No. 2300, No. 900, MCF88, No. 33, No. 40, No. 45, No. 52, MA7, MA8, MA100, and No. 2200B (trade names of products manufactured by Mitsubishi Chemical Corporation); Raven 5750, Raven 5250, Raven 5000, Raven 3500, Raven 1255, and Raven 700 (trade names of products manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (trade names of products manufactured by CABOT JAPAN K.K.); and Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, and Special Black 4 (trade names of products manufactured by Degussa).

Examples of the pigment used in white inks include C.I. Pigment White 6, 18, and 21.

Examples of the pigment used in yellow inks include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in magenta inks include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of the pigment used in cyan inks include C.I. Pigment Blue 1, 2, 3, 15, 15:1, 15:2, 15:3, 15:34, 15:4, 16, 18, 22, 25, 60, 65, and 66; and C.I. Vat Blue 4 and 60.

Examples of the pigment other than magenta, cyan, and yellow pigments include C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

The pigments may be used alone or in a combination of two or more thereof.

Dye

In the embodiment, the coloring material may be a dye. Any dye, such as acid dyes, direct dyes, reactive dyes, and basic dyes, can be used. Examples of the dye include C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

The dyes may be used alone or in a combination of two or more thereof.

The content of the coloring material is preferably 1 to 20% by mass based on the total mass (100% by mass) of the ink composition. Within the content range, satisfactory color-developing properties can be obtained, and prevention of curing of a coating film due to light absorption by the coloring material itself can be decreased.

Dispersant

When the ink composition of the embodiment contains a pigment, the ink composition may further contain a dispersant for well dispersing the pigment. Any dispersant can be used. For example, a dispersant that is commonly used for preparing a pigment-dispersed liquid, such as a polymer dispersant, can be used. Specific examples of such a dispersant include those of which main component is at least one selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. Examples of commercially available polymer dispersants include Ajisper series (trade name) manufactured by Ajinomoto Fine-Techno, Solsperse series (e.g., Solsperse 36000 (trade name) available from Avecia Co.), Disperbyk series (trade name) manufactured by BYK Chemie, and Disparlon series (trade name) manufactured by Kusumoto Chemicals.

The dispersants may be used alone or in a combination of two or more thereof. The amount of the dispersant is not particularly limited, and an approximate amount thereof may be added.

Slipping Agent

The ink composition of the embodiment may further contain a slipping agent (surfactant). Any slipping agent can be used. For example, silicone surfactants such as polyester-modified silicone and polyether-modified silicone can be used. In particular, polyether-modified polydimethylsiloxane and polyester-modified polydimethylsiloxane are preferred. Specific examples thereof include BYK-347, BYK-348, BYK-UV3500, 3510, 3530, and 3570 (each manufactured by BYK Chemie).

The slipping agents may be used alone or in a combination of two or more thereof. The amount of the slipping agent is not particularly limited, and an approximate amount thereof may be added.

Other Additives

The ink composition of the embodiment may contain additives (components) in addition to the above-described additives. Such components are not particularly limited. For example, generally known penetration accelerator and wetting agent (moisturizing agent) and other additives can be used. Examples of the other additive include generally known fixing agent, antifungal agent, preservative, antioxidant, UV absorber, chelating agent, pH adjuster, and thickener.

Physical Properties of Photocurable Ink Jet Recording Ink Composition

The ink composition of the embodiment preferably has a viscosity at 25° C. of 5 to 15 mPa·s.

The ink composition can be cured by irradiation with ultraviolet light having an emission peak wavelength in the range of preferably 350 to 420 nm, more preferably 360 to 400 nm. The ink composition is preferably cured by irradiation with a UV energy of 400 mJ/cm$^2$ or less, more preferably 300 mJ/cm$^2$ or less. The use of such an ink composition allows formation of an image at low cost.

Thus, according to the embodiment, it is possible to provide a photocurable ink jet recording ink composition that has excellent curing properties, adhesion, and photopolymerization initiator solubility. Furthermore, the ink composition containing a predetermined amount of the vinyl ether group-containing (meth)acrylic esters, which have a predetermined structure including both a vinyl group and a (meth)acrylic group in one molecule, can have a lower viscosity and less odor and skin irritation and have excellent reactivity and adhesion. On the other hand, the ink composition containing a predetermined amount of the monofunctional (meth)acrylate having an aromatic ring skeleton, which has both an aromatic ring and a (meth)acrylic group in one molecule, can have a low viscosity and have excellent reactivity and photopolymerization initiator solubility.

Recording Medium

The ink composition of the embodiment is discharged on a recording medium by a recording method described below to form a recorded matter. The recording medium may be absorbable or nonabsorbable. The recording method of the embodiment described below can be widely applied to various recording media exhibiting highly different degrees of absorbability, i.e., from non-absorbing media into which aqueous ink hardly permeates to absorbing media into which aqueous ink easily permeates. In the case of applying the ink composition to a non-absorbing recording medium, for example, a drying step may be required after curing the ink composition by exposure to ultraviolet light.

Any absorbing recording medium can be used, and examples thereof include plain paper such as electrophotographic paper highly absorbing aqueous inks, ink jet paper (special paper for ink jet printing and having an ink absorbing layer containing silica particles or alumina particles or an ink absorbing layer made of a hydrophilic polymer such as polyvinyl alcohol (PVA) or polyvinyl pyrrolidone (PVP)), and paper showing relatively low absorbability for aqueous inks and used in ordinary offset printing, such as art paper, coated paper, and cast-coated paper.

Any non-absorbing recording medium can be used, and examples thereof include films, sheets, and plates of plastics such as polyvinyl chloride (PVC), polyethylene, polypropylene, and polyethylene terephthalate (PET); plates of metals such as iron, silver, copper, and aluminum; metal plates coated with such various metals by vapor deposition; plastic films; and plates of alloys such as stainless steel and brass.

Recording Method

An embodiment of the invention relates to a recording method. The photocurable ink jet recording ink composition according to the embodiment described above can be used in the recording method of this embodiment. The recording method can be applied to an ink jet system. The recording method includes a discharging step of discharging the above-described ink composition onto a recording medium; and a curing step of curing the ink composition discharged in the discharging step by irradiating the ink composition with ultraviolet light. The ink composition thus cured on the recording medium forms a coating film (cured film).

Discharging Step

In the discharging step, an ink composition is discharged onto a recording medium so that the ink composition adheres to the recording medium. The ink composition at the time of being discharged preferably has a viscosity of 5 to 30 mPa·s. In the case of an ink composition having such a viscosity at room temperature or in a non-heated state, the ink composition may be discharged at room temperature or without being heated. In such a case, the temperature of the ink at the time of being discharged is preferably 20 to 30° C. Alternatively, an ink composition may be heated to a predetermined temperature to adjust the viscosity to a proper level and may be then discharged. Thus, satisfactory discharge stability is achieved.

The photocurable ink jet recording ink composition of the embodiment has a higher viscosity than those of ordinary aqueous ink compositions. The viscosity therefore largely varies depending on changes in temperature when the ink composition is discharged. The change in viscosity of the ink highly affects the sizes of droplets and the droplet-discharging speed, which may cause deterioration in image quality. Accordingly, it is preferred to maintain the temperature of the ink at the time of discharging as constant as possible.

Curing Step

Subsequently, the ink composition discharged and adhering to the recording medium is cured by light (ultraviolet) irradiation in the curing step. This is caused by that the photopolymerization initiator contained in the ink composition is decomposed by ultraviolet irradiation to generate initiation species such as radicals, acids, or bases and that polymerization of the polymerizable compound is accelerated by the function of the initiation species, or is caused by that polymerization of the polymerizable compound starts by ultraviolet irradiation. If the ink composition contains a sensitizing dye together with the photopolymerization initiator, the sensitizing dye in the system absorbs ultraviolet light and thereby changes to an excited state, which accelerates decomposition of the photopolymerization initiator by contact therewith. As a result, more sensitive curing reaction is achieved.

As the ultraviolet light source, a mercury lamp or a gas/solid laser is mainly used. As light sources for curing photocurable ink jet recording ink compositions, mercury lamps and metal halide lamps are widely used. However, from the viewpoint of environmental protection, it is highly desired to be mercury-free, and replacement by GaN-based semiconductor ultraviolet light emitting devices is very useful industrially and environmentally. In addition, ultraviolet light-emitting diodes (UV-LEDs) and ultraviolet light-emitting laser diodes (UV-LDs) are small-sized and have long life and high efficiency and are low in cost, and are therefore expected as light sources for photocurable ink jet recording. Among them, UV-LEDs are preferred.

A UV-LED having an emission peak wavelength in a range of 350 to 420 nm (more preferably 360 to 400 nm) can easily increase the output and is therefore suitable for a recording method using a photocurable ink jet recording ink composition that can be cured by irradiation with an energy of preferably 400 mJ/cm$^2$ or less, more preferably 300 mJ/cm$^2$ or less. In such a case, a high printing speed can be obtained at low cost. Such an ink composition can be obtained by containing a photopolymerization initiator that is decomposed by exposure to ultraviolet light having a wavelength in the above-mentioned range and/or a polymerizable compound that starts polymerization by exposure to ultraviolet light having a wavelength in the above-mentioned range.

Thus, according to the embodiment, it is possible to provide a satisfactory recording method using a photocurable ink jet recording ink composition that has excellent curing properties, adhesion, and solubility of a photopolymerization initiator.

EXAMPLES

The embodiments of the first invention will now be more specifically described by non-limiting examples.

Components

Components used in the following Examples and Comparative Examples are as follows.

Polymerizable Compound:

VEEA (trade name of 2-(2-vinyloxyethoxy)ethyl acrylate manufactured by Nippon Shokubai Co., Ltd., hereinafter abbreviated as "VEEA")

APG-100 (trade name of dipropylene glycol diacrylate manufactured by Shin-Nakamura Chemical Co., Ltd., hereinafter abbreviated as "DPGDA")

IBXA (trade name of isobornyl acrylate manufactured by Osaka Organic Chemical Industry Ltd., hereinafter abbreviated as "IBXA")

APG-200 (trade name of tripropylene glycol diacrylate manufactured by Shin-Nakamura Chemical Co., Ltd., hereinafter abbreviated as "TPGDA")

SR230 (diethylene glycol diacrylate manufactured by Sartomer Company Inc., hereinafter abbreviated as "DEGDA")

Viscoat #192 (trade name of phenoxyethyl acrylate manufactured by Osaka Organic Chemical Industry Ltd., hereinafter abbreviated as "PEA")

FA-BZA (trade name of benzyl acrylate manufactured by Hitachi Chemical Company, Ltd., hereinafter abbreviated as "BA")

Photopolymerization Initiator:

IRGACURE 819 (trade name, manufactured by BASF, hereinafter abbreviated as "819")

DAROCUR TPO (trade name, manufactured by BASF, solid content: 100%, hereinafter abbreviated as "TPO")

KAYACURE DETX-S (trade name, manufactured by Nippon Kayaku Co., Ltd., hereinafter abbreviated as "DETX-S")

Pigment:

Pigment Black 7 (carbon black) (Microlith Black C-K (trade name), manufactured by BASF, hereinafter abbreviated as "Black")

Dispersant:

Solsperse 36000 (trade name, manufactured by Lubrizol, hereinafter abbreviated as "Sol36000")

Examples 1 to 24

The components shown in the following tables were mixed in various compositions (unit: % by mass) shown in the tables, and the mixtures were stirred with a high-speed water-cooled stirrer to obtain black ink compositions.

TABLE 1

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| Polymerizable | VEEA | 20.0 | 20.0 | 10.0 | 30.0 | 20.0 | 10.0 | 30.0 | 10.0 | 40.0 | 5.0 |
| compound | DPGDA | 65.0 | 35.0 | 30.0 | 30.0 | 5.0 | 5.0 | 5.0 | 65.0 | 30.0 | 30.0 |
|  | IBXA |  |  |  |  |  |  |  |  |  |  |
|  | TPGDA |  |  |  |  |  |  |  |  |  |  |
|  | DEGDA |  |  |  |  |  |  |  |  |  |  |
|  | PEA |  | 30.0 | 45.0 | 25.0 | 60.0 | 70.0 | 50.0 | 10.0 | 15.0 | 50.0 |
|  | BA |  |  |  |  |  |  |  |  |  |  |

TABLE 1-continued

| | | Example | | | | | | | | | | |
|---|---|---|---|---|---|---|---|---|---|---|---|
| | | 1 | 2 | 3 | 4 | 5 | 6 | 7 | 8 | 9 | 10 |
| Photopolymerization initiator | 819 | 6.0 | 6.0 | 6.0 | 6.0 | 6.0 | 6.0 | 6.0 | 6.0 | 6.0 | 6.0 |
| | TPO | 4.0 | 4.0 | 4.0 | 4.0 | 4.0 | 4.0 | 4.0 | 4.0 | 4.0 | 4.0 |
| | DETX-S | 2.0 | 2.0 | 2.0 | 2.0 | 2.0 | 2.0 | 2.0 | 2.0 | 2.0 | 2.0 |
| Pigment | Black | 2.0 | 2.0 | 2.0 | 2.0 | 2.0 | 2.0 | 2.0 | 2.0 | 2.0 | 2.0 |
| Dispersant | Sol36000 | 1.0 | 1.0 | 1.0 | 1.0 | 1.0 | 1.0 | 1.0 | 1.0 | 1.0 | 1.0 |
| Total | | 100.0 | 100.0 | 100.0 | 100.0 | 100.0 | 100.0 | 100.0 | 100.0 | 100.0 | 100.0 |

TABLE 2

| | | Example | | | | | | | | | | | | | |
|---|---|---|---|---|---|---|---|---|---|---|---|---|---|---|---|
| | | 11 | 12 | 13 | 14 | 15 | 16 | 17 | 18 | 19 | 20 | 21 | 22 | 23 | 24 |
| Polymerizable compound | VEEA | 30.0 | 30.0 | 10.0 | 10.0 | | 65.0 | 30.0 | 15.0 | 20.0 | 30.0 | 33.0 | 30.0 | 30.0 | 30.0 |
| | DPGDA | | | 3.0 | 70.0 | 30.0 | 10.0 | | 20.0 | 35.0 | 30.0 | 30.0 | | 30.0 | |
| | IBXA | 30.0 | | | | | | | | | 25.0 | 25.0 | 33.0 | 25.0 | 30.0 |
| | TPGDA | | 30.0 | | | | | | | 15.0 | | | | | |
| | DEGDA | | | | | | | 30.0 | | | | | | | |
| | PEA | 25.0 | 25.0 | 72.0 | 5.0 | 55.0 | 10.0 | 25.0 | 35.0 | | | | 25.0 | | 25.0 |
| | BA | | | | | | | | | 30.0 | | | | | |
| Photopolymerization initiator | 819 | 6.0 | 6.0 | 6.0 | 6.0 | 6.0 | 6.0 | 6.0 | 6.0 | 6.0 | 6.0 | 6.0 | 6.0 | 6.0 | 6.0 |
| | TPO | 4.0 | 4.0 | 4.0 | 4.0 | 4.0 | 4.0 | 4.0 | 4.0 | 4.0 | 4.0 | 4.0 | 4.0 | 4.0 | 4.0 |
| | DETX-S | 2.0 | 2.0 | 2.0 | 2.0 | 2.0 | 2.0 | 2.0 | 2.0 | 2.0 | 2.0 | 2.0 | 2.0 | 2.0 | 2.0 |
| Pigment | Black | 2.0 | 2.0 | 2.0 | 2.0 | 2.0 | 2.0 | 2.0 | 2.0 | 2.0 | 2.0 | | | 2.0 | 2.0 |
| Dispersant | Sol36000 | 1.0 | 1.0 | 1.0 | 1.0 | 1.0 | 1.0 | 1.0 | 1.0 | 1.0 | 1.0 | | | 1.0 | 1.0 |
| Total | | 100.0 | 100.0 | 100.0 | 100.0 | 100.0 | 100.0 | 100.0 | 100.0 | 100.0 | 100.0 | 100.0 | 100.0 | 100.0 | 100.0 |

Evaluation Items

1. Curing Property

The respective nozzle arrays of an ink jet printer, PX-G5000 (trade name, manufactured by Seiko Epson Corporation), were filled with the photocurable ink compositions prepared above. A solid pattern image (recording resolution: 720×720 dpi) was printed on a PET film (Rumirer 125E20 (trade name), manufactured by Toray Industries, Inc.) under ordinary temperature and ordinary pressure with a dot diameter of middle so that the printed matter has a thickness of 6 μm. After printing, the solid pattern image was cured by irradiation with 200 mJ/cm$^2$ of ultraviolet light having a wavelength of 395 nm at an irradiation intensity of 60 mW/cm$^2$ using a UV-LED (Firefly, manufactured by Phoseon) in an ultraviolet irradiation device. Thus, recorded matters where solid pattern images were printed on PET films were produced. The solid pattern image is an image that has recorded the dot for every pixel, the pixel is a minimum recording unit region defined by recoding resolution.

The irradiation energy [mJ/cm$^2$] was determined as the product obtained by multiplying the irradiation intensity [mW/cm$^2$] on the surface irradiated with light from a light source by the irradiation duration time [s]. The irradiation intensity was measured using an ultraviolet ray intensity meter, UM-10, and a receptor head, UM-400 (both manufactured by Konica Minolta Sensing, Inc.).

The curing properties of coating films were evaluated using the irradiation energy at the time of tack-free as an index. Whether a coating film was in a tack-free state or not was determined based on the following conditions: whether an ink adhered to a cotton swab or not and whether a cured ink material on a recording medium was abraded or not. When the ink did not adhere to a cotton swab and also the cured ink material on a recording medium was not abraded, the coating film was determined to be in a tack-free state. The cotton swab used was Johnson cotton swab manufactured by Johnson & Johnson. Each coating film was rubbed with the cotton swab back and forth 10 times under a load of 100 g.

The evaluation results are shown in the following tables, and the evaluation criteria are as follows:

AA: irradiation energy at tack-free time was 150 mJ/cm$^2$ or less,

A: irradiation energy at tack-free time was higher than 150 mJ/cm$^2$ and 200 mJ/cm$^2$ or less, B: irradiation energy at tack-free time was higher than 200 mJ/cm$^2$ and 300 mJ/cm$^2$ or less, and C: irradiation energy at tack-free time was higher than 300 mJ/cm$^2$ and 400 mJ/cm$^2$ or less.

2. Curing Wrinkles

The respective nozzle arrays of an ink jet printer, PX-G5000 (trade name, manufactured by Seiko Epson Corporation), were filled with the photocurable ink compositions prepared above. A solid pattern image (recording resolution: 720×720 dpi) was printed on a PET film (Rumirer 125E20 (trade name), manufactured by Toray Industries, Inc.) under ordinary temperature and ordinary pressure with a dot diameter of middle so that the printed matter has a thickness of 6 μm. After printing, the solid pattern image was cured by irradiation with 200 mJ/cm$^2$ of ultraviolet light having a wavelength of 395 nm at an irradiation intensity of 60 mW/cm$^2$ using a UV-LED in an ultraviolet irradiation device. If the curing of a sample did not reach a tack-free state, the irradiation was continued until the sample reached a tack-free state.

Thus, recorded matters where solid pattern images were printed on PET films were produced.

The method of confirming a tack-free state and solid pattern images and the measurement and calculation of irradiation energies and irradiation intensities are the same as those in the "curing properties" evaluation.

The degrees of occurrence of curing wrinkles were evaluated by visually observing the surface of each solid pattern image after completion of curing.

The evaluation results are shown in the following tables, and the evaluation criteria are as follows:

A: no wrinkles were observed on the image surface after curing,

B: a few wrinkles were observed on the image surface after curing, and the surface roughness Rq was 4 or less, and C: wrinkles were observed on the image surface after curing, and the surface roughness Rq was higher than 4.

3. Adhesion Evaluation by Peeling Test

Transparent adhesive tape (width: 25±1 mm) was put on a coating film of each image formed by solid printing under the same conditions (printing and curing conditions) as those in the "curing wrinkles" evaluation. The tape was sufficiently rubbed with a finger so that the coating film can be seen through the tape. Within 5 min from the adhesion, the tape was certainly peeled off at an angle of about 60 degrees with taking 0.5 to 1.0 sec.

The evaluation results are shown in the following tables, and the evaluation criteria are as follows:

A: no peeling of coating film was observed, and

B: peeling of coating film was observed.

4. Adhesion Evaluation by Cutting Test

In accordance with JIS K-5600-5-6 (ISO 2409) (Testing methods for paints—Part 5: Mechanical property of film—Section 6: Adhesion test (Cross-cut test), adhesion between a PET film (Rumirer 125E20 (trade name), manufactured by Toray Industries, Inc.) and an image formed by solid printing under the same conditions (printing and curing conditions) as those in the "curing wrinkles" evaluation was evaluated. The cross-cut test will now be described.

As cutting tools, a single blade cutter (commonly commercially available cutter) and a guide for making cuts at equal intervals with the single blade cutter were prepared.

First, six cuts were made in a recorded matter with the blade of the cutter vertically put on the coating film. After making the six cuts, the blade was turned by 90 degrees and made another six cuts so as to be orthogonal to the six cuts previously made.

About 75 mm of transparent adhesive tape (width: 25±1 mm) was attached to the coating film at the portion provided with the cuts in a lattice form. The tape was sufficiently rubbed with a finger so that the coating film can be seen through the tape. Within 5 min from the adhesion, the tape was certainly peeled off at an angle of about 60 degrees with taking 0.5 to 1.0 sec.

The evaluation results are shown in the following tables, and the evaluation criteria are as follows:

A: peeling was observed in less than 5% of the lattices,

B: peeling was observed in 5% or more and less than 35% of the lattices, and

C: peeling was observed in 35% or more of the lattices.

5. Abrasion Resistance

In accordance with JIS K5701 (ISO 11628) (regulation for methods of testing ink, color-developing sample, and printed matter used in planographic printing), abrasion resistance was evaluated using a Gakushin-type rubbing fastness tester (manufactured by Tester Sangyo Co., Ltd.). A cannequin was placed on the surface of a recorded matter (solid printed matter) obtained by solid printing under the same conditions (printing and curing conditions) as those in the "curing wrinkles" evaluation. The surface was rubbed with the cannequin under a load of 500 g. Peeling off of cured surface of the recorded matter after rubbing was compared by visual observation.

The evaluation results are shown in the following tables, and the evaluation criteria are as follows:

A: no stain was observed on the cannequin, and no peeling and scratch were observed on the printed surface, B: stain was observed on the cannequin, but no peeling and scratch were observed on the printed surface, and C: stain was observed on the cannequin, and peeling and scratch were observed on the printed surface.

6. Storage Stability

Twenty-four milliliters of each of the ink compositions was put in a 30-mL glass bottle and was left to stand at 60° C. for 1 week with light shielding. An increase in viscosity of each ink by leaving to stand was calculated from the viscosities before and after the leaving, and storage stability of the ink was evaluated based on the increase.

The evaluation results are shown in the following tables, and the evaluation criteria are as follows:

A: the rate of increase in viscosity was less than 5%,

B: the rate of increase in viscosity was 5% or more and less than 10%, and

C: the rate of increase in viscosity was 10% or more.

7. Photopolymerization Initiator Solubility

Components excluding the pigment and the dispersant in each ink composition in the examples were sufficiently stirred at room temperature to prepare ink compositions not containing pigment. Subsequently, whether undissolved photopolymerization initiator was present or not was visually evaluated.

The evaluation results are shown in the following tables, and the evaluation criteria are as follows:

A: no undissolved photopolymerization initiator was observed, and

B: undissolved photopolymerization initiator was observed.

TABLE 3

| | | Example | | | | | | | | | |
|---|---|---|---|---|---|---|---|---|---|---|---|
| | | 1 | 2 | 3 | 4 | 5 | 6 | 7 | 8 | 9 | 10 |
| Curing property | | C | A | A | AA | AA | A | AA | A | AA | B |
| Curing wrinkle | | C | A | A | A | A | A | A | A | B | A |
| Adhesion | Peeling | A | A | A | A | A | A | A | A | A | A |
| | Cutting | A | A | A | A | B | B | B | A | B | A |
| Abrasion resistance | | A | A | A | A | A | A | A | A | A | A |
| Storage stability | | B | A | A | A | A | A | A | A | B | A |
| Polymerization initiator solubility | | B | A | A | A | A | A | A | A | A | A |

TABLE 4

| | | Example | | | | | | | | | | | | |
|---|---|---|---|---|---|---|---|---|---|---|---|---|---|---|
| | | 11 | 12 | 13 | 14 | 15 | 16 | 17 | 18 | 19 | 20 | 21 | 22 | 23 | 24 |
| Curing property | | C | C | B | B | C | AA | C | B | AA | B | A | B | A | B |
| Curing wrinkle | | C | B | B | B | B | B | B | B | A | C | B | B | A | A |
| Adhesion | Peeling | B | A | B | A | A | A | A | B | A | A | A | A | A | B |
| | Cutting | C | B | B | A | A | B | B | B | A | A | A | B | A | C |
| Abrasion resistance | | B | A | B | A | A | A | B | A | A | A | A | B | A | B |
| Storage stability | | A | A | A | A | A | B | A | A | A | B | B | A | — | — |
| Polymerization initiator solubility | | A | A | A | A | A | A | A | A | A | B | B | A | — | — |

The results shown in the tables reveal that photocurable ink compositions (examples 2 to 10, 13, 14, 16, 18, and 19) each containing vinyl ether group-containing (meth)acrylic esters represented by Formula (I), dipropylene glycol di(meth)acrylate, monofunctional (meth)acrylate having an aromatic ring skeleton, and a coloring material are superior to other photocurable ink compositions in curing property, prevention of curing wrinkles, polymerization initiator solubility, adhesion, and abrasion resistance.

The ink compositions of examples 21 and 22 are examples not containing any coloring material. Though these ink compositions do not contain the dipropylene glycol di(meth)acrylate or the monofunctional (meth)acrylate having an aromatic ring skeleton, the curing properties are satisfactory and occurrence of curing wrinkles is satisfactorily low. However, these ink compositions do not contain any coloring material and cannot be therefore applied to coloring of recording media.

The ink compositions of examples 23 and 24 are the same as those of examples 20 and 11, respectively. These ink compositions were evaluated as in the ink compositions of examples 20 and 11 except that solid images were irradiated with ultraviolet light having an irradiation intensity of 60 mW/cm$^2$ (irradiation intensity-measuring conditions are the same as above), which was adjusted by attaching a filter to a metal halide lamp (SMX-3500/F—OS, manufactured by Oak & Co., Ltd.). Though these ink compositions do not contain the dipropylene glycol di(meth)acrylate or the monofunctional (meth)acrylate having an aromatic ring skeleton, the curing properties are satisfactory and occurrence of curing wrinkles is satisfactorily low. However, the recording media are deformed by the heat from the metal halide lamp. On the other hand, the photocurable ink compositions containing vinyl ether group-containing (meth)acrylic esters represented by Formula (I), dipropylene glycol di(meth)acrylate, monofunctional (meth)acrylate having an aromatic ring skeleton, and a coloring material are recognized as ink compositions exhibiting, in particular, excellent curing properties and sufficiently low occurrence of curing wrinkles by irradiation with light from every light sources. The storage stability and the polymerization initiator solubility of examples 23 and 24 are the same as those of examples 20 and 11, respectively, and were therefore not evaluated.

In the ink composition (example 14) containing the monofunctional (meth)acrylate having an aromatic ring skeleton in a content of less than 10%, it takes a long time to dissolve the photopolymerization initiator.

The embodiments of the second invention will now be more specifically described by non-limiting examples.
Components
Components used in the following Examples and Comparative Examples are as follows.
Vinyl Ether Group-Containing (Meth)Acrylic Esters:
VEEA (trade name of 2-(2-vinyloxyethoxy)ethyl acrylate manufactured by Nippon Shokubai Co., Ltd., hereinafter abbreviated as "VEEA")

Monofunctional (Meth)Acrylate Having an Aromatic Ring Skeleton:
Viscoat #192 (trade name of phenoxyethyl acrylate manufactured by Osaka Organic Chemical Industry Ltd., hereinafter abbreviated as "PEA")
FA-BZA (trade name of benzyl acrylate manufactured by Hitachi Chemical Company, Ltd., hereinafter abbreviated as "BZA")
Other Polymerizable Compounds:
NK Ester A-TMPT (trade name of trimethylolpropane triacrylate manufactured by Shin-Nakamura Chemical Co., Ltd., hereinafter abbreviated as "A-TMPT")
IBXA (trade name of isobornyl acrylate manufactured by Osaka Organic Chemical Industry Ltd., hereinafter abbreviated as "IBXA")
NK Ester APG-200 (trade name of tripropylene glycol diacrylate manufactured by Shin-Nakamura Chemical Co., Ltd., hereinafter abbreviated as "3PGA")
NK Ester APG-100 (trade name of dipropylene glycol diacrylate manufactured by Shin-Nakamura Chemical Co., Ltd., hereinafter abbreviated as "2PGA")
Photopolymerization Initiator:
IRGACURE 819 (trade name, manufactured by BASF, solid content: 100%, hereinafter abbreviated as "819")
DAROCUR TPO (trade name, manufactured by BASF, solid content: 100%, hereinafter abbreviated as "TPO")
KAYACURE DETX-S (trade name, manufactured by Nippon Kayaku Co., Ltd., solid content: 100%, hereinafter abbreviated as "DETX-S")
Polymerization Accelerator:
EBECRYL 7100 (trade name of amino acrylate manufactured by Cytech, Inc., hereinafter abbreviated as "EBECRYL")
Polymerization Inhibitor:
p-Methoxyphenol (manufactured by Tokyo Chemical Industry Co., Ltd., hereinafter abbreviated as "MEHQ")
Slipping Agent:
UV-3500 (trade name of a silicon-based surface conditioner manufactured by BYK Chemie, hereinafter abbreviated as "V3500")
Pigment:
Irgalite Blue Glvo (trade name of a cyan pigment (C.I. Pigment Blue 15:4) manufactured by BASF, hereinafter abbreviated as "BLUE GLVO")
Dispersant:
Solsperse 36000 (trade name, manufactured by Lubrizol, hereinafter abbreviated as "Sol36000")

Examples 1 to 15 and Comparative Examples 1 to 5

The components shown in Tables 5 and 6 were mixed in various compositions (unit: % by mass) shown in the tables, and the mixtures were stirred with a high-speed water-cooled stirrer to obtain cyan ink compositions.

TABLE 5

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Pigment | BLUE GLVO | 2.1 | 2.1 | 2.1 | 2.1 | 2.1 | 2.1 | 2.1 | 2.1 | 2.1 | 2.1 |
| Dispersant | SOL36000 | 0.5 | 0.5 | 0.5 | 0.5 | 0.5 | 0.5 | 0.5 | 0.5 | 0.5 | 0.5 |
| Acrylic vinyl-containing monomer | VEEA | 62.0 | 72.0 | 77.0 | 52.0 | 45.0 | 79.6 | 62.0 | 52.0 | 68.0 | 62.0 |
| Aromatic ring-containing monomer | PEA | 22.6 | 12.6 | 7.6 | 32.6 | 39.6 | 5.0 | 17.6 | 17.6 | 12.6 | — |
|  | BZA | — | — | — | — | — | — | — | — | — | 22.6 |
| Tri- or more-functional monomer | A-TMPT | — | — | — | — | — | — | 5.0 | 15.0 | — | — |
| Monofunctional monomer | IBXA | — | — | — | — | — | — | — | — | — | — |
| Difunctional monomer | 3PGA | — | — | — | — | — | — | — | — | — | — |
|  | 2PGA | — | — | — | — | — | — | — | — | — | — |
| Polymerization accelerator | EBECRYL | — | — | — | — | — | — | — | — | 4.0 | — |
| Polymerization inhibitor | MEHQ | 0.2 | 0.2 | 0.2 | 0.2 | 0.2 | 0.2 | 0.2 | 0.2 | 0.2 | 0.2 |
| Slipping agent | UV3500 | 0.2 | 0.2 | 0.2 | 0.2 | 0.2 | 0.2 | 0.2 | 0.2 | 0.2 | 0.2 |
| Photopolymerization initiator | 819 | 5.6 | 5.6 | 5.6 | 5.6 | 5.6 | 5.6 | 5.6 | 5.6 | 5.6 | 5.6 |
|  | TPO | 4.8 | 4.8 | 4.8 | 4.8 | 4.8 | 4.8 | 4.8 | 4.8 | 4.8 | 4.8 |
|  | DETX-S | 2.0 | 2.0 | 2.0 | 2.0 | 2.0 | 2.0 | 2.0 | 2.0 | 2.0 | 2.0 |
| Total amount of initiators |  | 12.4 | 12.4 | 12.4 | 12.4 | 12.4 | 12.4 | 12.4 | 12.4 | 12.4 | 12.4 |
| Total |  | 100.0 | 100.0 | 100.0 | 100.0 | 100.0 | 100.0 | 100.0 | 100.0 | 100.0 | 100.0 |

TABLE 6

|  |  | Example 11 | Example 12 | Example 13 | Example 14 | Example 15 | Comparative Example 1 | Comparative Example 2 | Comparative Example 3 | Comparative Example 4 | Comparative Example 5 |
|---|---|---|---|---|---|---|---|---|---|---|---|
| Pigment | BLUE GLVO | 2.1 | 2.1 | 2.1 | 2.1 | 2.1 | 2.1 | 2.1 | 2.1 | 2.1 | 2.1 |
| Dispersant | SOL36000 | 0.5 | 0.5 | 0.5 | 0.5 | 0.5 | 0.5 | 0.5 | 0.5 | 0.5 | 0.5 |
| Acrylic vinyl-containing monomer | VEEA | 62.0 | 62.0 | 47.0 | 47.0 | 45.0 | 40.0 | 83.0 | 62.0 | 38.0 | — |
| Aromatic ring-containing monomer | PEA | 23.7 | 25.5 | 17.6 | 17.6 | 35.5 | 40.0 | 1.6 | 3.0 | 46.6 | 40.0 |
|  | BZA | — | — | — | — | — | — | — | — | — | — |
| Tri- or more-functional monomer | A-TMPT | — | — | 20.0 | — | — | — | — | — | — | 14.6 |
| Monofunctional monomer | IBXA | — | — | — | — | — | 4.6 | — | 19.6 | — | — |
| Difunctional monomer | 3PGA | — | — | — | — | — | — | — | — | — | 20.0 |
|  | 2PGA | — | — | — | — | — | — | — | — | — | 10.0 |
| Polymerization accelerator | EBECRYL | — | — | — | 20.0 | — | — | — | — | — | — |
| Polymerization inhibitor | MEHQ | 0.2 | 0.2 | 0.2 | 0.2 | 0.2 | 0.2 | 0.2 | 0.2 | 0.2 | 0.2 |
| Slipping agent | UV3500 | 0.2 | 0.2 | 0.2 | 0.2 | 0.2 | 0.2 | 0.2 | 0.2 | 0.2 | 0.2 |
| Photopolymerization initiator | 819 | 4.5 | 5.0 | 5.6 | 5.6 | 7.0 | 5.6 | 5.6 | 5.6 | 5.6 | 5.6 |
|  | TPO | 4.8 | 3.0 | 4.8 | 4.8 | 7.5 | 4.8 | 4.8 | 4.8 | 4.8 | 4.8 |
|  | DETX-S | 2.0 | 1.5 | 2.0 | 2.0 | 2.0 | 2.0 | 2.0 | 2.0 | 2.0 | 2.0 |
| Total amount of initiators |  | 11.3 | 9.5 | 12.4 | 12.4 | 16.5 | 12.4 | 12.4 | 12.4 | 12.4 | 12.4 |
| Total |  | 100.0 | 100.0 | 100.0 | 100.0 | 100.0 | 100.0 | 100.0 | 100.0 | 100.0 | 100.0 |

Evaluation Items

1. Viscosity

The viscosity of each of the ink compositions prepared above was measured with a DVM-E-type rotational viscometer (manufactured by Tokyo Keiki Inc.) under conditions of a temperature of 25° C. and a rotational rate of 10 rpm. The evaluation results are shown in the following tables, and the evaluation criteria are as follows:

A: 15 mPa·s or less,
B: higher than 15 mPa·s and 25 mPa·s or less, and
C: higher than 25 mPa·s.

2. Curing Property

The respective nozzle arrays of an ink jet recording apparatus having piezo-type ink jet nozzles were filled with the ink compositions prepared above. A solid pattern image (recording resolution: 720×720 dpi) was printed on a PVC sheet (Flontlite Grossy 120g (trade name), manufactured by Cooley) under ordinary temperature and ordinary pressure so that the printed matter has a thickness of 10 μm, and the solid pattern image was cured by irradiation with ultraviolet light having a wavelength of 395 nm at an irradiation intensity of 1000 mW/cm$^2$ and a dose of 200 mJ/cm$^2$ per pass using a UV-LED in an ultraviolet irradiation device mounted on the side of a carriage. Thus, recorded matters where solid pattern images were printed on PVC sheets were produced. The "solid pattern image" is an image that has recorded the dot for every pixel, the pixel is a minimum recording unit region defined by recoding resolution.

The irradiation energy [mJ/cm$^2$] was determined as the product obtained by multiplying the irradiation intensity [mW/cm$^2$] on the surface irradiated with light from a light source by the irradiation duration time [s]. The irradiation intensity was measured using an ultraviolet ray intensity meter, UM-10, and a receptor head, UM-400 (both manufactured by Konica Minolta Sensing, Inc.).

The curing properties of coating films were evaluated by the number of passes until surface tack disappeared. The "number of passes" refers to the number of times of exposure of a recorded matter to ultraviolet light by moving the head toward the recorded matter and irradiating the light to the coating film from the ultraviolet irradiation device mounted on the head. The evaluation results are shown in the following tables, and the evaluation criteria are as follows:

A: one pass,
B: two passes, and
C: three or more passes.

3. Adhesion

Recorded matters cured by light irradiation until surface tack disappeared in the test of "2. Curing property" were used. In accordance with JIS K-5600-5-6 (ISO 2409) (Testing methods for paints—Part 5: Mechanical property of film—Section 6: Adhesion test (Cross-cut test), adhesion was evaluated based on the following ranks A to E from the results of a peeling test of recorded matters each having a coating film provided with cross-cuts and using adhesive tape. The cross-cut test will now be described.

As cutting tools, a single blade cutter (commonly commercially available cutter) and a guide for making cuts at equal intervals with the single blade cutter were prepared.

First, six cuts were made in a recorded matter with the blade of the cutter vertically put on the coating film. After making the six cuts, the blade was turned by 90 degrees and made another six cuts so as to be orthogonal to the six cuts previously made.

About 75 mm of transparent adhesive tape (width: 25±1 mm) was attached to the coating film at the portion provided with the cuts in a lattice form. The tape was sufficiently rubbed with a finger so that the coating film can be seen through the tape. Within 5 min from the adhesion, the tape was certainly peeled off at an angle of about 60 degrees with taking 0.5 to 1.0 sec.

The values of each rank are those obtained by rounding off the calculated peeling rates to integer values. The evaluation results are shown in the following tables.

The evaluation criteria are as follows:

A: peeling rate was 0 to 5%,
B: peeling rate was 6 to 15%,
C: peeling rate was 16 to 35%,
D: peeling rate was 36 to 65%, and
E: peeling rate was 66 to 100%.

4. Abrasion Resistance

In accordance with JIS K5701, an abrasion resistance test was performed using a Gakushin-type rubbing fastness tester (trade name, manufactured by Tester Sangyo Co., Ltd.). That is, a cannequin was placed on the surface of a recorded matter obtained in the test of "2. Curing wrinkles", and the recorded surface was rubbed back and forth 100 times with the cannequin under a load of 500 g. Peeling-off and scratches of the recorded matter surface after rubbing were visually observed.

The evaluation results are shown in the following tables. The evaluation criteria are as follows:

A: no stain was observed on the cannequin, and no peeling and scratch were observed on the recorded surface,
B: stain was observed on the cannequin, but no peeling and scratch were observed on the recorded surface,
C: stain was observed on the cannequin, and linear peeling and scratch were slightly observed on the recorded surface, and
D: stain was observed on the cannequin, and peeling and scratch were obviously observed on the recorded surface.

5. Photopolymerization Initiator Solubility

Components excluding the pigment and the pigment-dispersing component in each ink composition described above were sufficiently stirred. Subsequently, whether undissolved photopolymerization initiator was present or not was visually evaluated. The ink compositions not containing undissolved photopolymerization initiator were placed in a thermostat chamber at 0° C. After 24 hours, the ink compositions were taken out from the chamber, were warmed to room temperature, and were visually observed again for whether the photopolymerization initiator precipitated or not.

The evaluation results are shown in the following tables. The evaluation criteria are as follows:

A: no undissolved photopolymerization initiator and precipitation of the photopolymerization initiator were observed after stirring at room temperature and after storage at 0° C.,
B: no undissolved photopolymerization initiator was observed after stirring at room temperature, but precipitation of the photopolymerization initiator was observed after storage at 0° C., and
C: undissolved photopolymerization initiator was observed after stirring at room temperature.

6. Thin-Film Curing Property

Thin-film curing properties of the ink compositions in Examples 1, 9, and 14 were evaluated as in the test of "2. Curing property" except that the printed matters were formed so as to have a thickness of 2 μm instead of 10 μm. The evaluation results are shown in the following tables.

TABLE 7

| Evaluation item | Example 1 | Example 2 | Example 3 | Example 4 | Example 5 | Example 6 | Example 7 | Example 8 | Example 9 | Example 10 |
|---|---|---|---|---|---|---|---|---|---|---|
| Viscosity | A | A | A | A | A | A | A | A | A | A |
| Curing property | A | A | A | A | A | A | A | A | A | A |
| Adhesion | A | A | A | A | B | A | A | A | A | A |
| Abrasion resistance | B | B | B | B | B | B | A | A | B | B |
| Initiator solubility | A | A | B | A | A | B | A | A | A | A |
| Thin-film curing property | B | — | — | — | — | — | — | — | A | — |

TABLE 8

| Evaluation item | Example 11 | Example 12 | Example 13 | Example 14 | Example 15 | Comparative Example 1 | Comparative Example 2 | Comparative Example 3 | Comparative Example 4 | Comparative Example 5 |
|---|---|---|---|---|---|---|---|---|---|---|
| Viscosity | A | A | B | B | A | A | A | A | A | C |
| Curing property | B | B | A | A | A | B | A | C | B | B |
| Adhesion | A | A | A | A | B | D | A | A | D | C |
| Abrasion resistance | B | B | A | B | B | B | B | B | C | A |
| Initiator solubility | A | A | A | A | A | A | C | C | A | A |

TABLE 8-continued

| Evaluation item | Example 11 | Example 12 | Example 13 | Example 14 | Example 15 | Comparative Example 1 | Comparative Example 2 | Comparative Example 3 | Comparative Example 4 | Comparative Example 5 |
|---|---|---|---|---|---|---|---|---|---|---|
| Thin-film curing property | — | — | — | A | — | — | — | — | — | — |

The results shown in the tables reveal that the photocurable ink jet recording ink composition (Examples) each containing vinyl ether group-containing (meth)acrylic esters having a predetermined structure and monofunctional (meth)acrylate having an aromatic ring skeleton in the respective predetermined amounts are significantly superior to other ink compositions (Comparative Examples) at least in curing property, adhesion, and the solubility of photopolymerization initiator (initiator solubility).

What is claimed is:

1. A photocurable ink composition comprising polymerizable compounds and a photopolymerization initiator, wherein
the polymerizable compounds include:
vinyl ether group-containing (meth)acrylic esters represented by the following Formula (I):

$$CH_2=CR^1-COOR^2-O-CH=CH-R^3 \quad (I)$$

(wherein, $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms);
dipropylene glycol di(meth)acrylate; and
monofunctional (meth)acrylate having an aromatic ring skeleton,
the ink composition includes a coloring material,
wherein the content of the monofunctional (meth)acrylate having an aromatic ring skeleton is 10 to 60% by mass based on the total mass of the ink composition,
wherein the content of the dipropylene glycol di(meth)acrylate is in the range of 3 to 20% by mass based on the total mass of the ink composition,
wherein the photopolymerization initiator is an acylphosphine oxide compound and is contained in an amount between 7 and 15% by mass based on the total mass of the ink composition, and
wherein the content of the vinyl ether group-containing (meth)acrylic esters is in the range of 5 to 65% by mass based on the total mass of the ink composition.

2. The photocurable ink composition according to claim 1, wherein the content of the dipropylene glycol di(meth)acrylate is 5 to 25% by mass based on the total mass of the ink composition.

3. The photocurable ink composition according to claim 1, wherein the content of the vinyl ether group-containing (meth)acrylic esters is 10 to 30% by mass based on the total mass of the ink composition.

4. The photocurable ink composition according to claim 1, wherein the photopolymerization initiator is an acylphosphine oxide compound and is contained in an amount of 9 to 15% by mass based on the total mass of the ink composition.

5. The photocurable ink composition according to claim 1, wherein the ink composition is allowed to adhere to a recording medium and is cured by irradiation with light from an ultraviolet light-emitting diode having an emission peak wavelength in a range of 350 to 420 nm.

6. The photocurable ink composition according to claim 1, wherein the ink composition is curable by irradiation with an energy of 300 mJ/cm$^2$ or less from an ultraviolet light-emitting diode having an emission peak wavelength in a range of 350 to 420 nm.

7. The photocurable ink composition according to claim 1, wherein the vinyl ether group-containing (meth)acrylic esters are 2-(vinyloxyethoxy)ethyl acrylate.

8. An ink jet recording method comprising:
allowing the photocurable ink composition according to claim 1 to adhere to a recording medium; and
curing the adhering ink composition by irradiation with light from an ultraviolet light-emitting diode having an emission peak wavelength in a range of 350 to 420 nm.

9. An ink jet recording apparatus for allowing the photocurable ink composition according to claim 1 to adhere to a recording medium and curing the adhering ink composition by irradiation with light from an ultraviolet light-emitting diode having an emission peak wavelength in a range of 350 to 420 nm.

10. The photocurable ink composition according to claim 1, wherein the content of the vinyl ether group containing (meth)acrylic esters is 10 to 40% based on the total mass of the ink composition.

* * * * *